United States Patent [19]

Johnson et al.

[11] 4,201,908

[45] May 6, 1980

[54] MEASUREMENT AND RECORDING APPARATUS AND SYSTEM

[75] Inventors: Bernard A. Johnson, Deerfield; Frederick P. Gardner, Wonder Lake, both of Ill.

[73] Assignee: Mangood Corporation, Chicago, Ill.

[21] Appl. No.: 897,005

[22] Filed: Apr. 17, 1978

Related U.S. Application Data

[63] Continuation-in-part of Ser. No. 789,416, Apr. 21, 1977, abandoned.

[51] Int. Cl.[2] ........................ G08G 1/065; G06F 15/48

[52] U.S. Cl. ........................ 235/92 TC; 235/92 DP; 340/22

[58] Field of Search ........ 235/92 TC, 92 MT, 92 DP, 235/92 FQ, 99 A; 340/31 R, 22, 38 R, 38 L, 38 P, 38 S; 364/436, 424, 200 MS File, 900 MS File

[56] References Cited

U.S. PATENT DOCUMENTS

| | | | |
|---|---|---|---|
| 3,164,824 | 1/1965 | Fredericks et al. | 340/22 |
| 3,185,959 | 5/1965 | Barker | 340/38 R |
| 3,195,126 | 7/1965 | Barker | 340/22 |
| 3,275,994 | 9/1966 | Joseph | 364/200 |
| 3,322,940 | 5/1967 | Barker et al. | 235/92 TC |
| 3,821,715 | 6/1974 | Hoff et al. | 364/200 |

*Primary Examiner*—Joseph M. Thesz

*Attorney, Agent, or Firm*—Leydig, Voit, Osann, Mayer & Holt, Ltd.

[57] ABSTRACT

A system for measurement and recording of data as to events and conditions is disclosed including a recorder unit adapted to be located at a surveillance site and connected to detectors providing successive signals responsive to successive actuations by individual events, and a portable reader instrument adapted to be connected to said recorder unit. The recorder unit has semi-conductor memory for data and for instructions of a program, and a programmable data processor operable under the control of a program of instructions stored in memory to function in a recording mode. The data processor includes an arithmetic and logic unit for performing computational and decisional processes in a sequence determined by a program to count events in response to the detector signals, and to classify and accumulate the counts as data in separate locations in semi-conductor memory for separate real time periods. The portable reader instrument has a visual display device, a recording device, and a manually operable keyboard and switches for generating display commands and read commands and for transmitting those commands to the recorder unit for reading and displaying data as derived by the data processor of the recorder unit, without interruption of the recording mode, and to display on the visual display and re-record data received from the recorder unit in the recording device of the reader instrument. The reader instrument is employed both for monitoring the operation of the recorder unit and for collecting data recorded in the semi-conductor memory of the recorder unit.

26 Claims, 16 Drawing Figures

FROM FIG. 9A

TO FIG. 9A

MEASUREMENT AND RECORDING APPARATUS AND SYSTEM

This is a continuation in part of Bernard A. Johnson and Frederick Philip Gardner, application Ser. No. 789,416, filed Apr. 21, 1977, entitled "Measurement And Recording Apparatus and System", now abandoned.

This invention relates generally to instruments for measurement and recording, and more particularly, to instrument systems for measurement of events or conditions at a surveillance site, and for recording and collection of data based on such measurement.

This invention has general utility in the measurement and recording at a surveillance site of data relating to events or conditions that require counting and classifying, such as vehicle traffic on highways, pedestrian traffic through halls and malls, product movement on production or processing lines, the type and amounts of particular material or gasses (CO and $NO_2$) in the atmosphere and the incidence of high noise levels adjacent highways, airport runways or in factories. In a preferred form, the invention is applicable specifically to the recording and collection of vehicle traffic data, for which it is particularly well suited.

In general, it will be recognized that measurement and recording of data as to events and conditions of the kind described have been carried out heretofore with the use of both local and central type systems. With both types of systems, sensors or detectors are typically employed at surveillance sites for detecting the conditions or events under surveillance and supplying signals to apparatus at the sites. Local data recorder systems use apparatus of many different types. The simplest type of such apparatus includes counters which are incremented by signals from the detectors and accumulate a total count which is displayed on a dial. More complex apparatus provides for processing the signals from the detectors to derive other data, for example, in the case of highway vehicle monitoring systems, velocity, vehicle type and other traffic data which are recorded on paper or magnetic tape. To collect the data, personnel visit the surveillance sites and read the instrument dials or remove the records in the form of a roll of paper tape or cassette or reel of magnetic tape on which the data is recorded.

Central data recorder systems usually employ cables or telephone line connections from the apparatus at the site which is utilized to transmit the data over such cables or lines to a central processor and recorder. In such central systems, the apparatus at the site may be solely electrical or electronic apparatus for processing the signals from the detectors and converting those signals to a form suitable for line transmission to the central processor and recorder.

Local recorder systems, in general, have a number of advantages such as lower initial equipment cost and lower installation cost, and greater flexibility since the individual field recorder units may be shifted from one location to another as the need changes for information. Central recorder systems, while more costly in initial equipment and installation, are generally capable of obtaining and recording data of more complex character. In addition, because the unit at each site location of a central recorder system, serves only to process and transmit the data to a central recorder, the transmitter unit, in general, is of relatively simple construction and may be totally electronic with no recorder mechanism or other mechanical device being required as a component.

In the case of local recorder systems, the mechanical parts of recorder devices in the recorder units raise problems in system operation. These problems range from reliability and maintenance problems, particularly where the recorder units are out-of-doors and subjected to moisture, vibration, vandalism, temperature variations, etc., which may cause interruptions in operation or affect data reliability; to problems in data collection. Personnel charged with the responsibility of collecting the data travel to each site, remove the paper tape or magnetic tape record, replace the used record, and inspect the units to determine whether they are operating properly. Most local recorder units are desirably self-powered by batteries, and such recorder mechanisms consume substantial power and drain the batteries so that battery recharging or replacement on a frequent basis is necessary.

Thus, both local and central data recorder methods have their advantages and disadvantages. The disadvantages of the local recorder system revolve mainly about the practical problems of physically collecting the recorded data and maintaining the local recorder units due to their mechanical complexity and relatively heavy power consumption to insure consistent operation and reliable data. Furthermore, local recorder systems as presently known are not capable of processing detector signals to derive and classify data as to events or conditions of widely varying types without replacing the field units or components thereof.

It is, therefore, an object to provide a local recorder system which affords certain, although not all, advantages of central recorder systems while retaining the advantages of local recorder systems and eliminating their principal disadvantages.

More specifically, it is an object of the invention to provide apparatus for data collection, in the form of local recorder units for collecting and storing data not on expendible record medium as known heretofore, but in semi-conductor memory for subsequent readout and transfer to a recording device of a separate and inependent portable reader-recorder instrument.

A further object is to provide a local recorder unit which is programmable such that the kinds of data recorded in the unit may be changed, to suit changing surveillance needs, without requiring physical replacement or change of the components of the recorder unit.

Another object is to provide a local recorder unit which has no moving parts and uses no expendible elements, which have been required heretofore in local recorders, such as magnetic tape decks or paper tape drives, printers or punches which use expendible tapes or other recording medium, and simplifying the construction and reducing the cost of the local recorder units while at the same time increasing the flexibility of the recorder units to carry out a variety of data storage tasks and increasing the capacity of the individual recorder units for data storage.

More particularly, it is an object of this invention to provide a data collection system utilizing a plurality of local recorder units, each adapted to be placed at surveillance sites, and a single portable reader instrument which may be coupled to any one of the individual recorder units to monitor the operation of the recorder unit, check the validity of the stored data, change the programs in the recorder unit, and read the stored data from the recorder unit and re-record the data in the reader instrument, so that it is recorded for subsequent processing.

Another object of the invention is to provide a local recorder unit for data collection, particularly suited for traffic data collection, which utilizes individual recorder units which are programmable to carry out different functions, including:

1. Recording different traffic data simultaneously and accumulating such data for predetermined time periods, including:
   a. vehicle count from up to eight lanes of highway traffic,
   b. vehicle type classification,
   c. vehicle length classification,
   d. vehicle speed classification, and
   e. vehicle headway.
2. Transmitting the data while it is being recorded, to a separate reader instrument for display;
3. Transmitting accumulated data stored in the recorder unit, to a separate reader instrument for recording and other processing; and
4. Processing accumulated data stored in the receiver unit and converting the data to a format readable by a computer and transmitting the data in that format to a processing center.

How the foregoing objectives are achieved with this invention may be understood by referring to the accompanying drawings, wherein:

FIG. 1 illustrates a recorder unit connected by cable to a separate, portable reader instrument, in accordance with this invention.

FIG. 2 is an overall system diagram illustrating different methods for using the recorder units and reader instruments of the present invention, and showing that data read by reader instrument from a plurality of local recorder units and re-recorded on a recording device in the reader instrument, is transferrable by subsequent readout from the reader instrument to other recording medium for subsequent processing, such as a disk recorder, a computer, an IBM compatible tape unit, etc. Alternatively, with an acoustical coupler from the reader instrument, the recorded data in the recording device of the reader instrument may be transferred over telephone lines to a central processor. The system also illustrates direct transfer to telephone lines from the recorder units for transmittal to a central processing unit, or other peripheral device.

FIG. 3 is a schematic diagram illustrating a local recorder unit connected to vehicle detectors on a roadway, at a road site and connected by a cable to a reader instrument, the basic circuitry of the recorder instrument and reader instrument being illustrated in block diagram form.

FIGS. 4A and 4B taken together illustrate in schematic form the circuitry for a recorder unit and reader instrument exemplifying the present invention.

Figure 1:
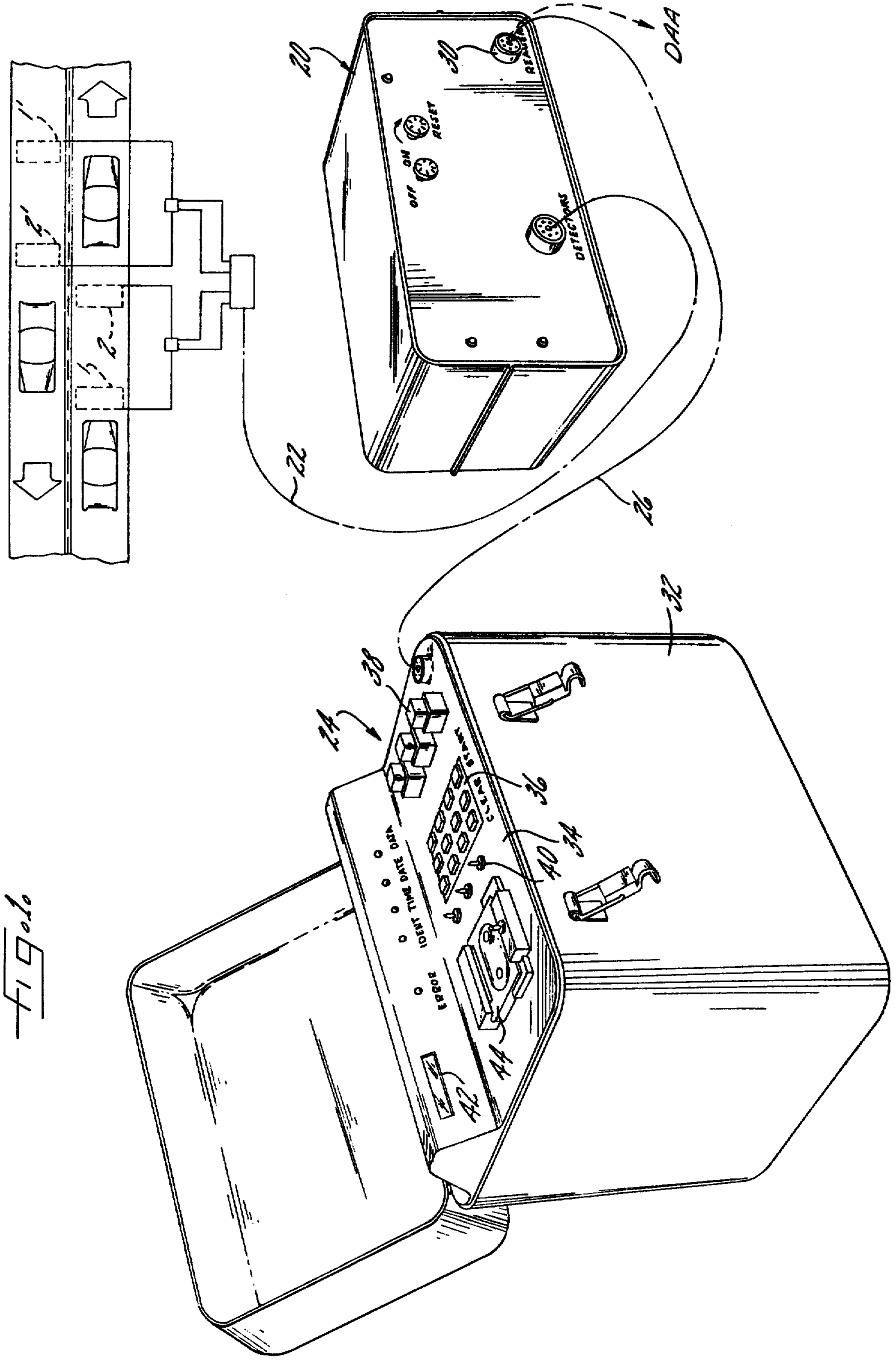

While the invention has utility in various fields for measurement and recording of data relating to events or conditions that require counting and classifying, such as in the field of pollution control where it is desired to detect, classify and record data as to pollutants (particulate or gases) in the atmosphere, or in the field of noise control where it is desired to detect, classify and record noise levels both inside buildings and out-of-doors, for the purpose of setting forth a preferred embodiment, the invention is shown in the drawings and will be described hereinafter embodied in apparatus for vehicle traffic surveillance.

TRAFFIC SURVEILLANCE SYSTEM

Referring to FIG. 1, apparatus constructed in accordance with the invention is shown as comprising a recorder unit 20 connected by a cable 22 to detectors 1, 2, 1', 2' providing output signals to the recorder unit 20. In this field of use, the detector output signals represent vehicles passing on the roadway which are to be counted and classified. In other fields of use, sensors or detectors will be used in a similar manner to produce signals representing the event or condition under surveillance. Included within the recorder unit 20 is a central processor unit (CPU) and semi-conductor memory means for program and data storage, the CPU operated under program control providing circuit means for counting events represented by signals received from the sensors or detectors, recording the count data in memory, and for reading such stored data from the memory. Applied in the field of traffic surveillance, traffic data in the form of vehicle count and classification is derived from the detector outputs, accumulated on a time interval basis and transferred to the memory means of the recorder unit for subsequent readout.

Also shown in FIG. 1 is a portable reader instrument 24 which, according to this invention, can be interconnected with the recorder unit 20 by a cable 26. A plug on one end of the connecting cable 26 is insertable into and removable from a terminal receptacle 30 on the recorder unit casing 32, and by means of this connecting cable 26 the reader instrument 24 may be interconnected with an individual one of a number of different recorder units, each adapted to be placed at a surveillance site, such as a roadside location, in the case of traffic surveillance.

The reader instrument 24 has a control panel 34, as indicated in FIG. 1, providing a keyboard 36 for manually controlling the reader instrument, and via the connecting cable 26, the recorder unit 20. Also provided on the control panel 34 of the reader instrument 24 are pushbutton switches 38, toggle switches 40, a visual display device 42, and a tape recording device 44. Included within the reader instrument 24 is a central processor unit (CPU) and semi-conductor memory for storage of programs. Programs are stored for operating the CPU of the reader instrument 24 under program control to read data from the memory component of the recording unit 20, under command from the reader instrument, and re-record such data on magnetic tape by means of the recording device 24. Programs are also stored in the reader instrument memory for transfer and loading into the program storage memory of the recorder unit 20.

Both the recorder unit 20 and reader instrument 24 are housed in weather-proof casings, the recorder unit casing being sealed since access into the unit is not required under conditions of normal use in the field. Access to the internal operating components of the recorder unit is provided by way of the "modem" and "detector" receptacles and the terminal receptacle 30 on the outside of the recorder unit casing. The reader instrument casing has a hinged cover which when closed provides a weather-proof casing, and the reader instrument 24 is portable for carrying from one site to another for collection of data stored in recorder unit memory by persons charged with that task.

Figure 2:
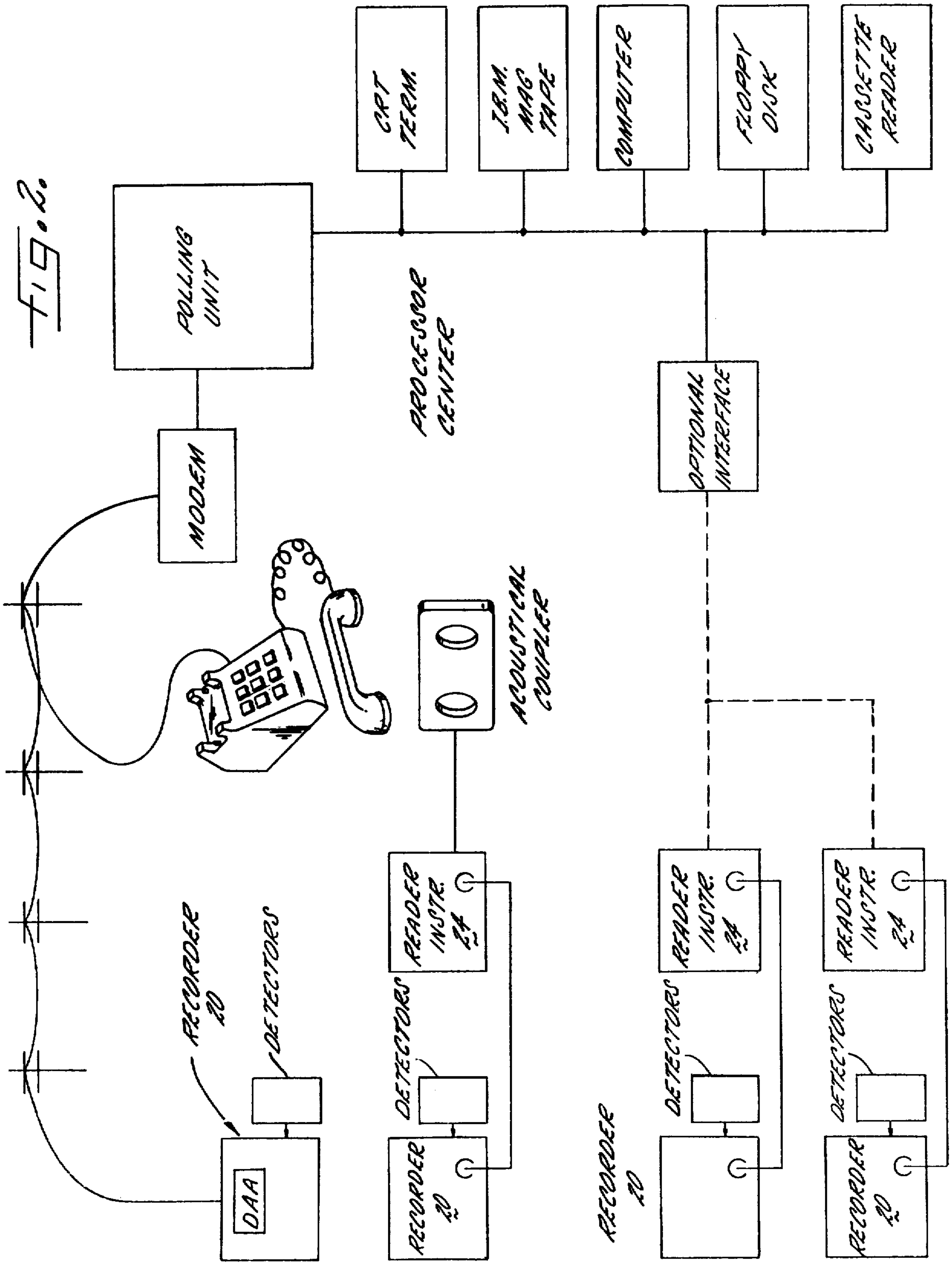

Also illustrated in FIG. 2 are other aspects of the system of this invention. Thus, the reader instrument 24 is also provided with the capability of reading data stored on recording medium such as magnetic tape and transmitting it to standard receiving equipment such as a disk recorder, a computer, a tape recorder, or other similar unit of a processor center. The processor center may be equipped with a tape reader, and in such event a cassette of magnetic tape may be removed from the reader instrument recording device, and the data on the cassette tape read in the processor center. With an acoustical coupler, the recorded data on tape in the recording device of the reader instrument may be transferred over telephone lines to a processor center, as shown in FIG. 2. Direct transfer to telephone lines from the recorder units for transmittal to a central processing unit is achieved with the recording unit of this invention having included therein a device DAA for reading data from the memory component of the recorder unit 20 and converting such data into form suitable for direct telephone line transmission to a processor center.

DETECTORS

Figure 7:
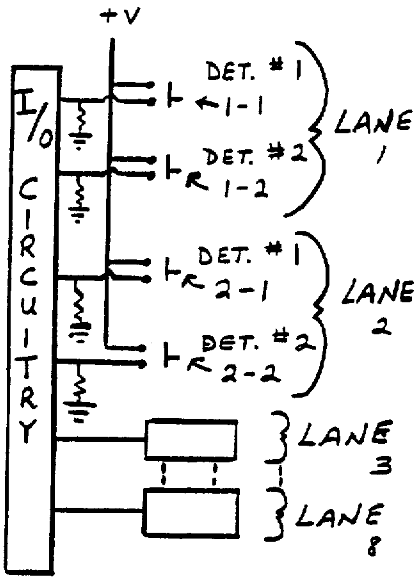
FIG. 7 illustrates detector relay contacts for multiple detector systems.

Recorder units 20 of this invention are supplied with signals from detectors or sensors that represent the event or condition under surveillance. In the field of traffic surveillance, vehicle representing signals are provided by detectors actuated by vehicles on the roadway. Such detectors may be pressure responsive devices, inductance loop type detectors, or other devices for providing vehicle representing signals as desired. For purposes of describing the invention, the recorder unit 20 in FIG. 1 is shown connected by the cable 22 to inductance loop type detectors on the highway, and signals from the detectors provide via the cable input signals to the recorder unit circuitry. Various arrangements of such inductance loop type detectors may be utilized depending on the data required. For example, to count vehicles and record count data, the simplest case, a single inductance type loop detector in each lane of, illustratively, a two-lane highway having north and south bound lanes, will provide the requisite signals for counting vehicles in each lane. To derive more complex data, such as vehicle velocity, two detectors are installed in a lane at a known spacing, for example, 16 feet from the leading edge of the first detector (detector #1) and the leading edge of the second detector (detector #2) in the direction of travel of the vehicles. With two conventional inductance loop detectors in each of lanes 1 and 2, each detector with its associated circuitry may be connected, as shown diagrammatically in FIG. 7, to actuate relay contacts 1-1, 1-2 and 2-1, 2-2, and produce an output signal representing a vehicle moving over the detector. When the vehicle reaches the leading edge of the detector, the relay contacts are closed, and such contacts remain closed until the vehicle leaves the detector. Referring to the diagrammatic timing diagram FIG. 8, vehicle representing signals from the two detectors (detectors #1 and #2) in a lane are shown as pulses or voltage levels established and maintained by the detector contacts 1-1, 1-2. From detector #1 (the first detector in a lane in the direction of vehicle travel), a pulse is supplied for the duration a vehicle is over detector #1. From detector #2 (the second detector in the same lane), a pulse is supplied for the duration a vehicle is over detector #2. As will be explained hereafter, with the distance between the leading edge of detector #1 and detector #2 being known, and the time for the vehicle to travel that distance being represented by the time interval $T_1$ between the leading edge of the first pulse and the leading edge of the second pulse, velocity for that vehicle may be derived. Moreover, in carrying out the invention, with the velocity having been derived for a vehicle, and the duration of time $T_2$ for the vehicle to move over detector #1 being represented by the length of the first pulse, the length of the vehicle may be derived to provide vehicle length data.

RECORDER UNIT

Figure 3:
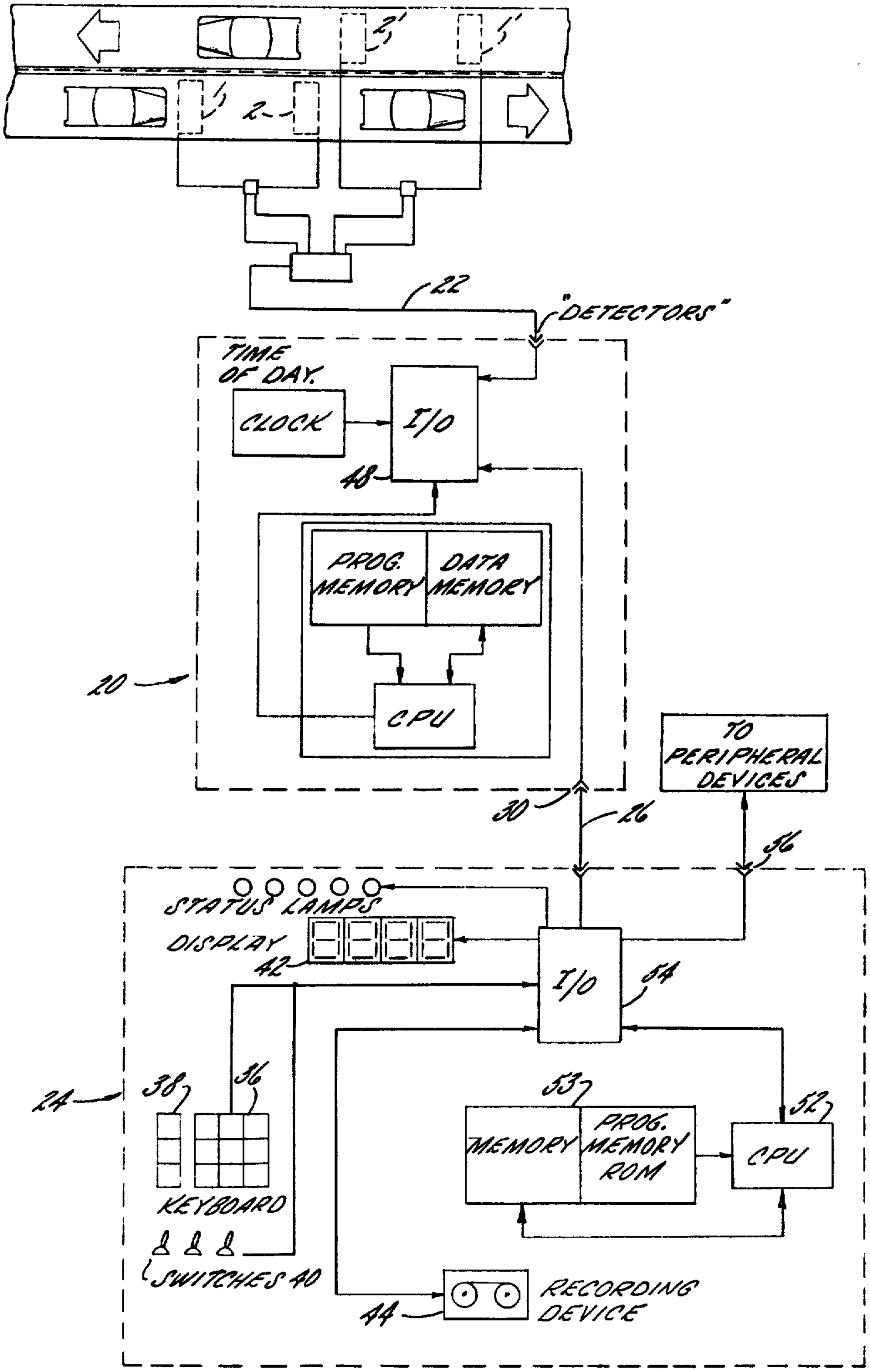

In accordance with the present invention, the recorder unit 20 is constructed as shown in FIG. 3 using a central processor unit (CPU) 46 preferably directly connected with program and data storage means (memory) 50. The input/output circuitry 48 interfaces with the peripheral devices to which the recorder unit 20 is connected, such as vehicle detectors and a reader instrument 24. As earlier noted, the recorder unit 20 may be connected via lines with other peripheral devices in a processor center (see FIG. 2) such as a CRT terminal, a computer, disk storage unit or the like through a modem.

In keeping with the preferred form of the invention, the CPU 46, program and data storage means 50 and input/ouput circuitry 48 are implemented with semiconductor chips, and for the CPU 46 it is preferred to utilize a microprocessor, Intersil IM 6100 having been found suitable and being preferred for that purpose. A standard RAM memory system organized in a plurality of memory fields is preferably employed to provide the program and data storage means 50. It is recognized, however, that other microprocessors, and other forms of program and data storage, or data processing and memory storage circuits constructed using discrete components, may be used and the invention is not limited to the specific components described hereinafter. It is preferred, however, to operate a programmable processor under program control to perform the various functions carried out by the recorder unit, alone and in association with the reader instrument 24 and other peripheral devices.

It has been found that recorder units so constructed and operated provide many advantages when used in the field with the reader instrument of this invention. Where the recorder units are utilized to derive and store traffic data, the reader instrument may be utilized to monitor and display the velocity and other traffic data concerning vehicles passing on the highway without interrupting the ongoing recording process, to calibrate the recorder units based on operator observation, to reprogram the recorder units to change the type of traffic data derived and stored, as well as to read data stored in the recorder units and re-record it in the reader instrument. The combination of recorder units and reader instrument provides a more facile system for collecting traffic data. How that is achieved will appear from the following.

Reader Instrument

The reader instrument 24, like the recorder unit 20, is constructed using a central processor unit (CPU) 52, data storage means 53, with input/output circuitry 54 for interfacing with the devices on the control panel 34 including the visual display device 42, such as an LED or LCD display and also the peripheral devices to which the reader instrument is connected, principally the recorder unit 20 as shown in FIG. 3. It will be recalled, however, that the reader instrument 24, as shown in FIG. 2, may be connected to other peripheral devices for transmittal of data recorded in the recording device 56 of the instrument. The block diagram of FIG. 2 of the circuitry of the reader instrument will be recognized, as will the block diagram for the recorder unit circuitry, as conventional block diagrams for microprocessor based products.

The reader instrument 24 of this invention is operable to monitor the operation of the recorder unit 20 and display to the operator on the display 42 one or more of the various traffic conditions being recorded, as they are recorded by and without affecting the ongoing recording process carried out in the recorder unit. The reader instrument 24 of this invention further includes means for calibrating the recorder unit and for loading programs into the memory 50 interfaced with the programmable processor of the recorder unit, the data storage means 53 of the reader instrument being provided for recorder unit program storage as well as program storage required for program control of the functions of the reader instrument. While heretofore, local recorder units have had a single mode of operation to record data as to traffic conditions, means are provided in the reader instrument to change the operating mode of the recorder unit of this invention from a recording mode to a transmitting or readout mode, such that the recorder unit and reader instrument operate in combination to provide for recording data and for reading out the data for subsequent processing, analysis and use.

The data collection procedure with this invention can be readily contrasted with that presently used. Presently, the person charged with data collection travels to each recorder unit site, opens the recorder unit case, removes the paper tape or cassette of magnetic tape with the recorded data from the unit, and writes information in a notebook or tag as to the station number, data, etc. A new roll of paper tape or fresh section of unused tape is threaded into the printed device, or a fresh cassette is inserted into the recorder unit and the unit is reset for ongoing recording. The batteries must be inspected as well as the machine overall to insure it is operating properly. The record tape is carried to the central recorder station where the data is then converted to punch cards, printed records or otherwise processed.

With the system of this invention, on the other hand, the person charged with data collection carries the portable reader instrument 24 to each recorder unit site and couples the cable 26 to a weather-proof receptable 30 on the outside of the case of the recorder unit (FIG. 1). This automatically connects the reader instrument 24 and the recorder unit 20 electrically. In keeping with the invention, the reader instrument keyboard 36, pushbuttons 38 and toggle switches 40, through the circuitry provided in the instrument, are operable to transmit commands to the recorder unit over the cable 26, and also to record on the record medium in the recording device 44 of the reader instrument, station number, date and other header data as a preliminary to reading data from the recording unit. The data stored in the memory of the recorder unit 20 may also be verified for station number, time, date and validity, to determine whether the recorder unit has been operating properly. Provision is thus made for determining whether the recorder unit 20 is malfunctioning, and if so, the unit may be replaced in the field.

The collection procedure with checking for proper operation of the recorder unit 20 and validity of the stored data is a very simple and rapid procedure with the present invention, involving only plugging in the reader instrument cable 26 to the recorder unit 20 and performing the verification and header procedures with the aid of the manual controls of the reader instrument 24.

The apparatus of this invention facilitates the data collection procedure as well as the procedure of processing the data, by using in the reader instrument 24 a recording device 44 having a data storage capacity which is much greater than the data storage capacity of the individual local recorder units 20. Using, as preferred, cassettes of magnetic tape as the storage medium in the reader instrument 24, data gathered from a plurality of local recorder units 20 may be recorded on a single cassette of tape. This not only facilitates collection of data by reducing the number of cassettes required to be handled in the field, but also facilitates the processing of data at the processing center and eliminates errors since the data read from each local recorder unit 10 and recorded on the magnetic tape is clearly identified on the tape itself.

System Operation

The recorder unit 20 is operative in a number of different modes. When connected only to the detectors of an adjacent highway (lanes 1 and 2, detectors #1, #2), it is operative in a recording mode involving processing under program control signals received from the detectors to derive traffic data, such as vehicle count, velocity and/or length, and recording such traffic data in the memory components of the recorder unit. When also connected to the reader instrument 24, the recorder unit 20 is operative in one of several different modes under control from the reader instrument. For example, the recorder unit is operative to continue recording of traffic data and also to display such data on the visual display device 42 provided by the reader instrument—a display mode; the recorder unit 20 is operative to read traffic data from its memory components, which data is re-recorded in the recording device 44 included in the reader instrument—a read mode; it is operative to change the programs in the program memory component of the recording unit, such new programs being transferred from the reader instrument—a re-programming mode; it is operative to be calibrated by instructions received from the reader instrument—a calibration mode; it is operative to check its programs and processing routines and sub-routines—a diagnostic mode. These are exemplary of the various modes in which the recorder unit is operative.

With regard to the reader instrument, when connected to the recorder unit it is operative in corresponding modes to those described for the recorder unit, i.e., a read re-record mode, a display mode, a recorder calibration mode, a recorder diagnostic mode. The reader instrument is also operable to set up or reset the recorder unit for its recording mode of operation.

CPU and Memory Architecture

As stated above, various conventional CPU's and memory devices may be used for the recorder unit 20 and receiver instrument 24 to carry out, under program control, the functions of these devices. Intersil brochure 40M 8/75 describes the IM 6100 microprocessor previously referred to as a suitable and preferred CPU for both the recorder unit and reader instrument. Briefly summarizing the description contained in said brochure, the IM 6100 CPU is a single address, fixed word length, parallel transfer microprocessor using 12-bit, two's complement arithmetic. The internal circuitry is static and designed to operate at any speed between DC and the maximum operating frequency. The CPU is supplied with external crystal clock signals. These signals are utilized to establish the timing and state signals internally by the timing and state control circuit. The CPU is also supplied with pulses on a frequency related to real time, and through the program control of the CPU provides a time base synchronized with time of day and permitting under program control, storage of traffic or other data in separate memory locations of predetermined fixed time intervals, such as one half hour or one hour, so that when subsequently read out an additional item of data is provided, namely, the time of day of traffic flow conditions.

Figure 4A:
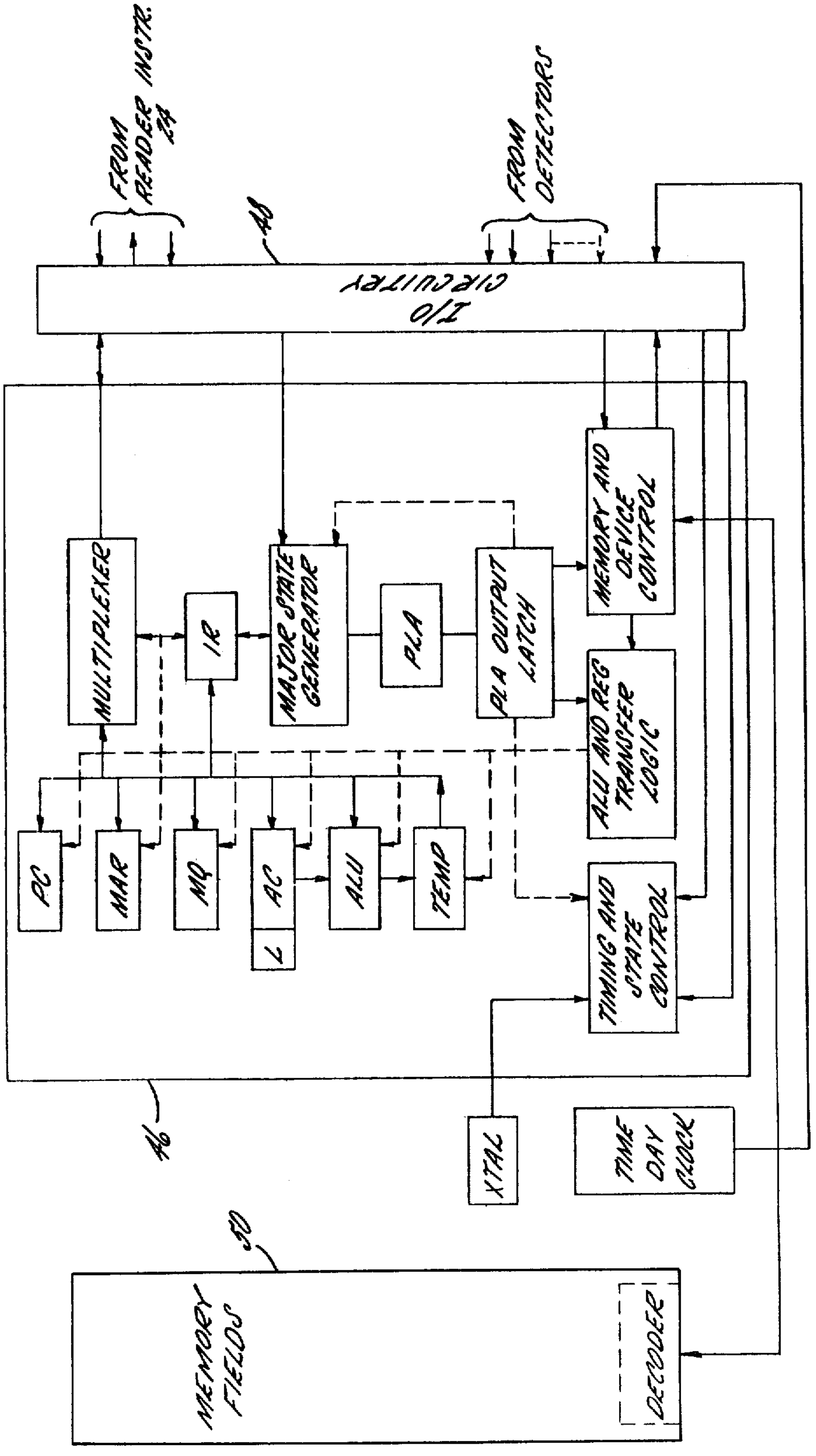
Figure 4B:
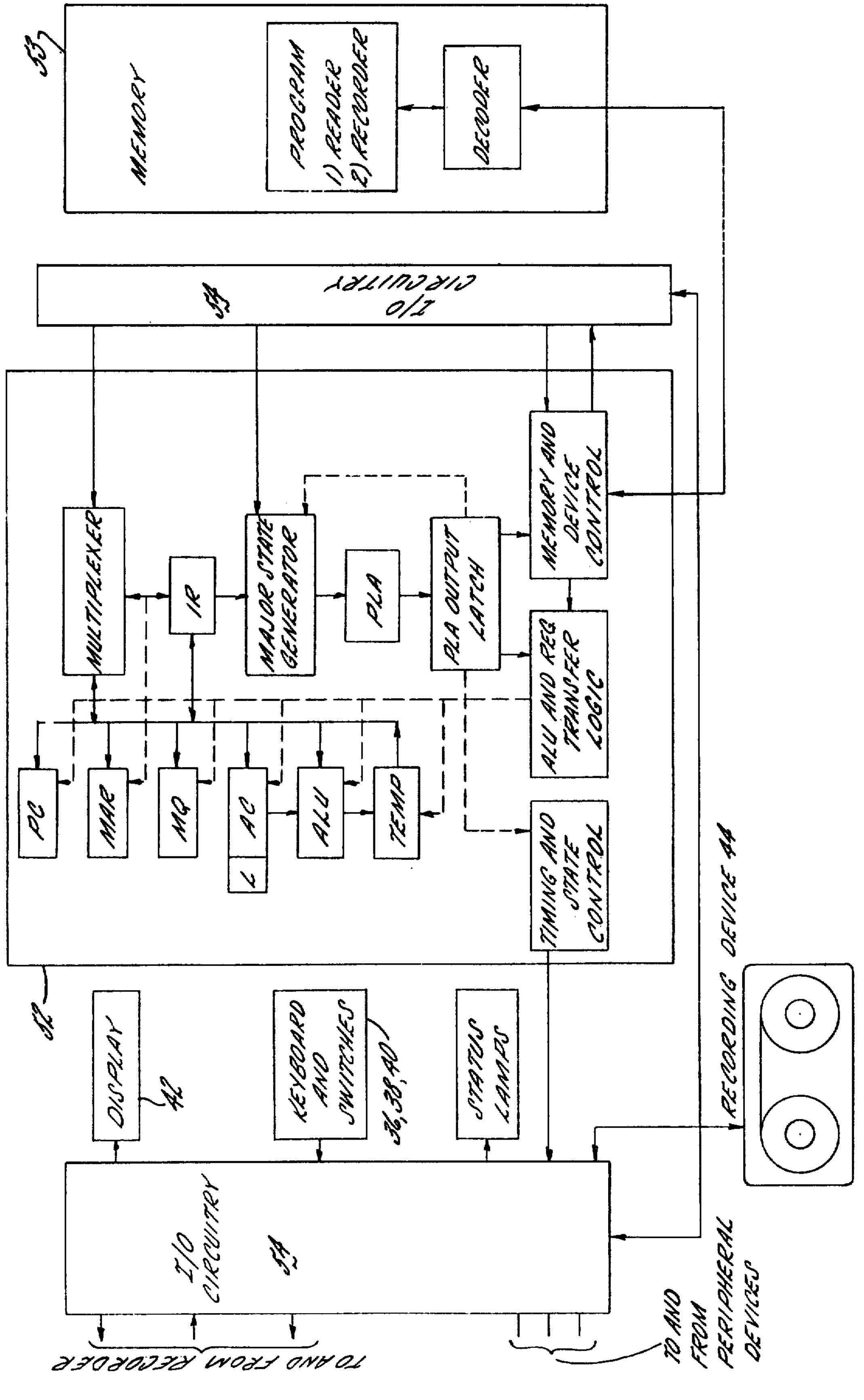

The CPU is diagrammatically illustrated in FIGS. 4A and 4B as comprising an accumulator (AC) which is a 12-bit register with which arithmetic and logical operations are performed. Data words may be fetched from RAM memory to the accumulator or stored from the accumulator into memory. The accumulator also serves as an input/output register and all programmed data transfer passes through the accumulator.

The 12-bit memory address register (MAR) contains the address of the memory location that is currently selected for reading or writing. The MAR is also used as an internal register for microprogram control during data transfers to and from memory and peripheral devices. The 12-bit program counter (PC) contains the address of the memory location from which the next instruction is fetched. During an instrument fetch, the PC contents are transferred to the memory address register and the PC is then incremented by one. Branching normally takes place under program control, however, during an input/output operation, a peripheral device may specify a branch address. Under program control, skip instruction increments may be achieved with the PC, and a peripheral device can also cause the next sequential instruction to be skipped via the PC.

The arithmetic and logical unit (ALU) performs both arithmetic and logical operations—two's complement binary addition, AND, OR and complement.

The 12-bit input/output multiplexer handles data, address and instruction transfers, into and out of, the CPU, from or into, the main memory and peripheral devices on a time-multiplexed basis.

During an instruction fetch, the instruction to be executed is loaded into the instruction register (IR). The programmed logic array (PLA) is then used for the correct sequencing of the CPU for the appropriate instruction. After an instruction is completely sequenced, the major state generator scans the internal priority network, the state of which decides whether the machine is going to fetch the next instruction in sequence or service one of a plurality of external request lines.

The memory and device control unit provides external control signals to communicate with peripheral devices, memory and other registers.

The instructions of a program for control of the CPU are 12-bit words stored in memory. The CPU makes no distinction between instructions and data which are transferred into and out of the CPU via the multiplexer and accumulator. The preferred IM 6100 microprocessor has a basic addressing capacity of 4K 12-bit words, which may be expanded. A preferred memory system is organized in 4K word blocks called memory fields. Each memory field is subdivided into pages numbered sequentially. The high order bits of a 12-bit memory address denote the page number and the lower order bits specify the address of the memory location within the given page. During an instruction fetch cycle, the contents of the program counter are transferred to the memory address register and the program counter is incremented by one so that it contains the address of the next sequential instruction.

The CPU utilizes a technique of addressing a location pointed to by the contents of the PC. Locations on a current page of the memory system are directly addressed by the MAR contents, and locations on other pages are indirectly addressed by a pointer address in a directly addressable location on the current page.

There are three general classes of memory instructions, referred to as memory reference instructions (MRI), operate instructions (OI), and input/output transfer instructions (IOT). The memory reference instructions (MRI) operate on the contents of a memory location or use the contents of a memory location to operate on the accumulator or the program counter. The operate instructions (OI) consist of groups of microinstructions used to perform logical operations on the contents of the accumulator, to test the contents of the accumulator or to perform logical operations on the contents of the accumulator and other registers.

The input/output transfer instructions (IOT) are used to initiate the operation of peripheral devices and to transfer data between peripheral devices and the CPU. The IM 6100 provides for three types of data transfer with peripheral devices; programmed data transfer; interrupt transfers used in interrupt systems to service several peripheral devices simultaneously permitting computational operations to be performed concurrently with data transfer operations; and direct memory access by which variable-size blocks of data are transferred between peripheral devices and the memory with a minimum of program control.

After an instruction is completely sequenced, the major state generator scans the internal priority network, the state of the priority network deciding the next sequence of the machine. This priority network is connected to wait and reset lines. If no signals appear on such lines, the CPU fetches the next instruction pointed to by the contents of the program counter.

While various memory systems may be utilized, a preferred system for a recorder unit 20 constructed using an IM 6100 CPU which has a basic addressing capacity of 4K 12-bit words, employs integrated circuit RAM semi-conductor chips providing a full 32K words of memory, to provide capacity for storing large amounts of program instructions and traffic data. The data is represented in memory location in unsigned integer notation in the preferred memory system.

With the maximum number ranges for such a notation being 4094, it will be noted that since the maximum vehicle count per lane on the heaviest traveled highway does not exceed 2000 vehicles per hour, the accumulated vehicle count for two lanes may be stored in one memory location without overflowing, when accumulated for separate one hour periods. Optionally, with double precision, the maximum number range will be about $(4K)^2$, and a greater vehicle count may in such case then be stored.

The memory system also provides the "registers" referred to in connection with the programs detailed later. Thus, the memory system provides memory locations, rather than requiring discrete memory registers, serving the category register functions wherein vehicle velocity and vehicle length data, for example, are accumulated for periods of time followed by the transfer of accumulated totals to separate memory locations.

Further details on the memory system architecture and organization may be obtained by referring to the previously identified brochure for the CPU IM 6100, 40M 8/75. Said brochure also provides information as to how to program this particular CPU. With the use of such information, a programmer can write the software and program this CPU to carry out desired functions. Of course, the software will vary depending on the particular functions to be performed. In order to explain this invention, illustrative programs are described hereinafter for the recorder unit and receiver instrument CPU's when used in the field of traffic surveillance, but it should be understood that by modifying and changing the programs, this apparatus may be suited for measurement and recording in the other fields mentioned hereinbefore.

Program Control

The various functions carried out by the recorder unit 20 and reader instrument 24 under program control may best be understood by referring to program flow charts on FIGS. 5, 6, 9 and 10. It is well within the capability of one having ordinary skill in the art to program a microprocessor of standard type to implement these flow charts.

Figure 5A:
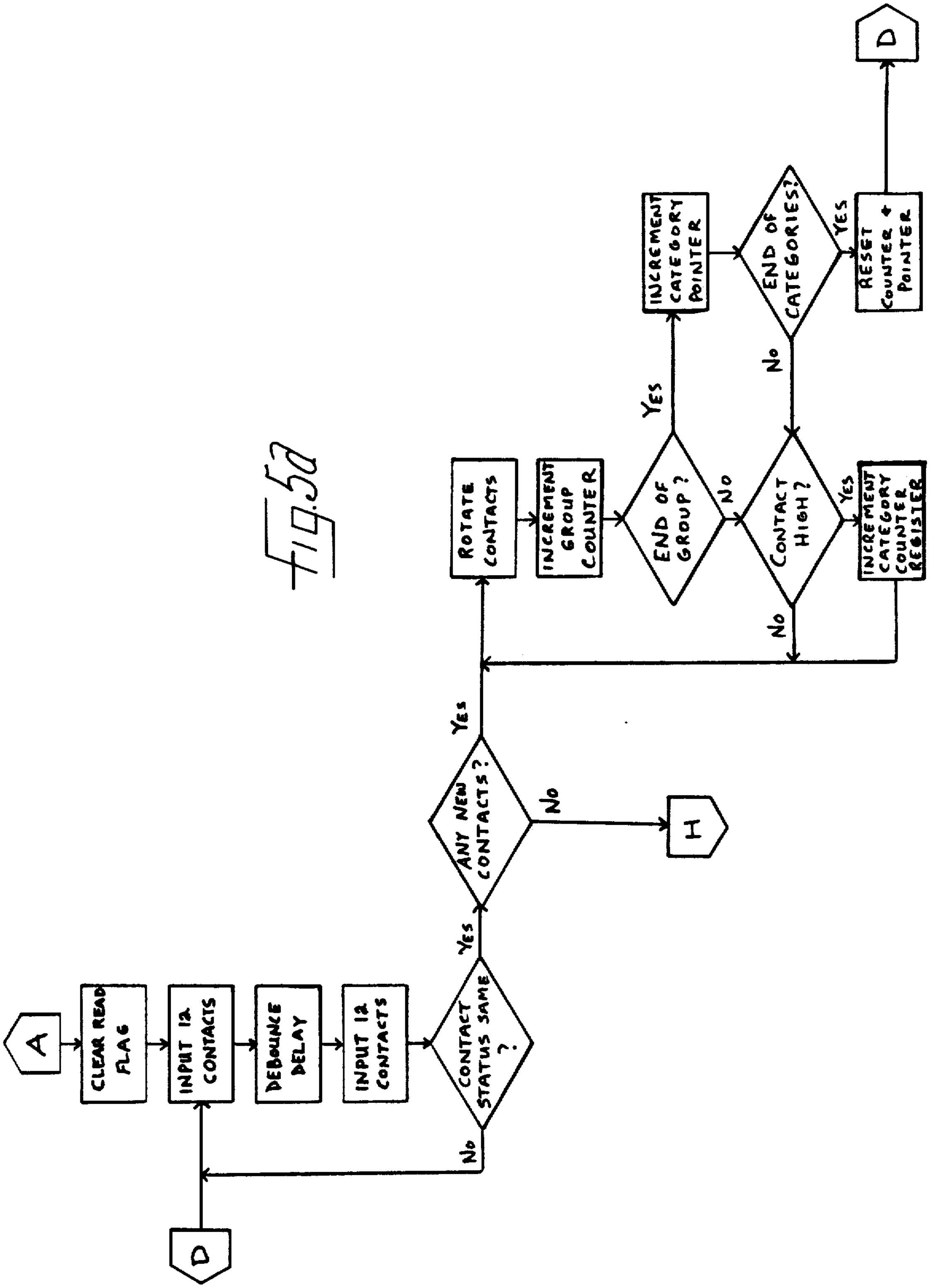
FIGS. 5A and 5B depict a flow diagram which the data processing system of the recorder unit of this invention utilizes.
Figure 5B:
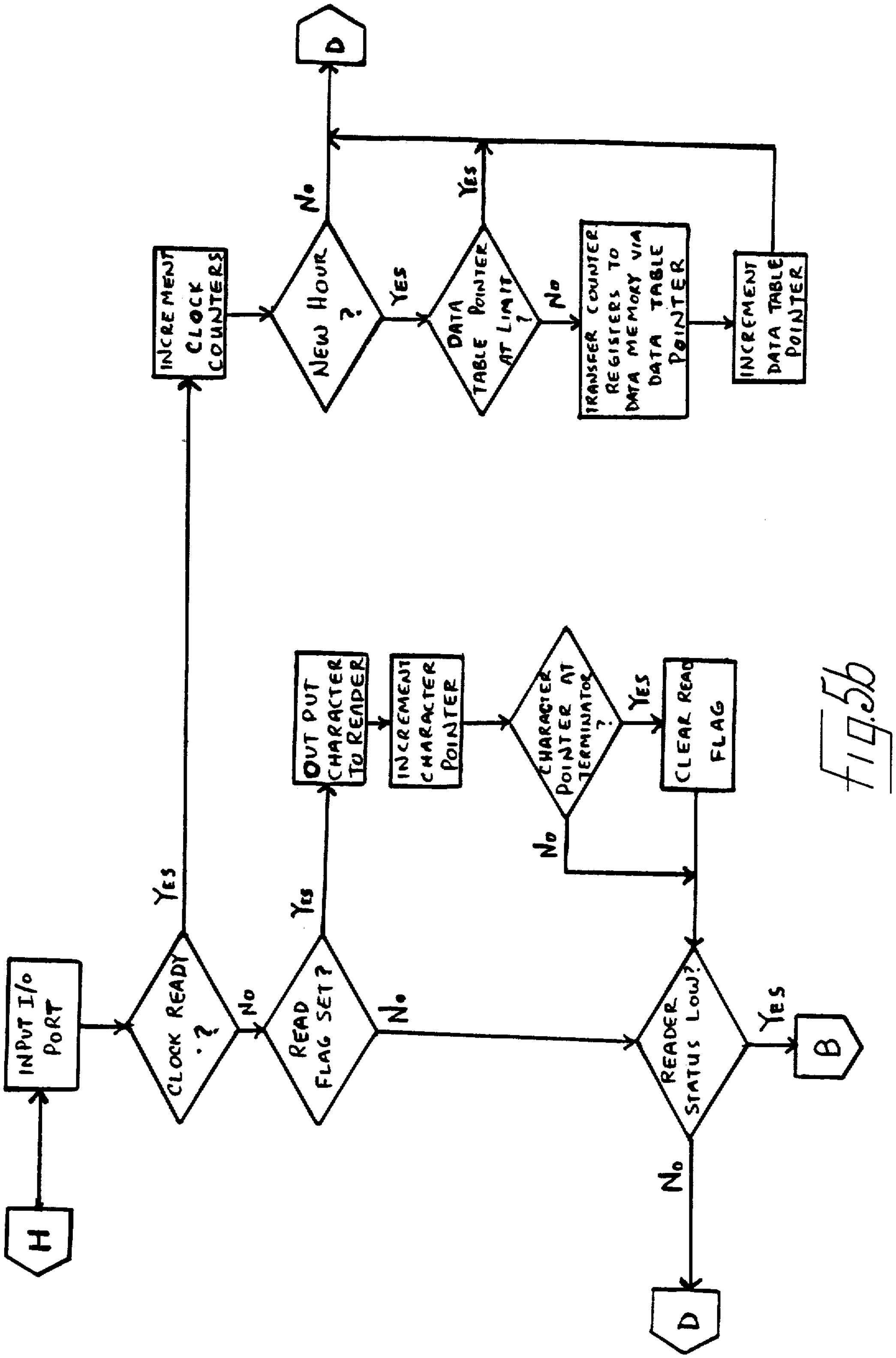
Figure 6:
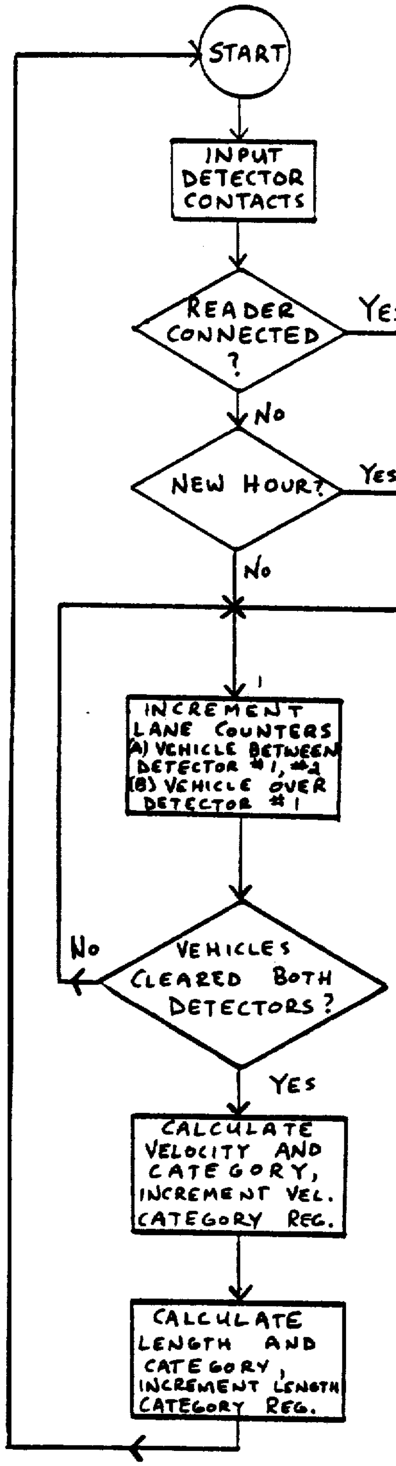
FIG. 6 depicts a general flow diagram for a recorder unit program for deriving and storing vehicle classification data.

A program for vehicle counting is shown on FIGS. 5A–5B, and will be used as a simple example to explain various functions of the recorder unit. While other programs may be used, more complex programs are shown in FIGS. 6, 9 and 10, for controlling the recorder unit to derive and store more complex traffic data, and for controlling the reader instrument when connected to the recorder unit.

The recorder unit may be considered located at a roadside site and connected to single detectors in each lane of a two-lane road to monitor traffic in both lanes. To operate the recorder unit in accordance with the invention, a program for vehicle counting described in the flow chart of FIGS. 5A–5B is stored in the recorder unit memory to operate the CPU to derive vehicle count from vehicle representing signals from the lane detectors, which is the desired traffic data, and store vehicle count for each lane for one-hour periods in separate locations in the memory system.

Referring again to FIG. 5A, it will be seen that with the power turned on in the recorder unit and after the recorder unit processor executes a clear routine in response to the reset switch being actuated, the step is executed to transfer the detector input signals appearing on the data input ports of the CPU to the accumulator. The incoming signals from the detectors are routed by the input/output circuitry to specific processor ports which are used for transfer of data to and from the accumulator on a time multiplexed basis, while other ports transmit and receive control and clock signals.

In the case of the vehicle counting program flow charted in FIGS. 5A and 5B, this program provides for counting vehicles in a multiple lane highway adjacent the site at which the recorder unit is located and contemplates counting vehicles in up to 12 lanes of traffic. The input/output circuitry thus provides for transfer of the outputs from single detectors in each of up to 12 lanes to separate processor ports. The preferred CPU of the recorder unit has an accumulator (AC) which is a 12 bit register to which up to 12 detector outputs are transferred via 12 specified input/output ports in the form of a positive or a zero voltage level ("1" or "0")representing the state of the detector contacts.

Referring to FIG. 5A, the program there illustrated shows as the first step "clear read flag". In this program, reading of vehicle count data from memory and transfer of such data to the read instrument on command, is interleaved with measurement and recording of vehicle count, so that the ongoing measurement and recording process proceeds without interruption as the read operation is carried out. Thus, with the reader instrument connected to the recorder unit, by operating the reader instrument keyboard to issue a read command, a flag signal is established which will result in the transfer of vehicle count data stored in semi-conductor memory of the recorder unit, to the reader instrument for re-recording. As a first step in this program, however, the read flag if established is cleared, so that the measurement and recording process may proceed.

Thus, the next step is "input 12 contacts", which represents that the detector outputs for as many lanes as are being monitored and which are connected by the input/output circuitry to corresponding processor ports, are transferred as "1's" or "0's" to the accumulator of the CPU of the recorder unit. The program compares the contents of the accumulator each program cycle, with the contents the previous program cycle. A change in any bit, when caused by a vehicle passing from the zone over the detector, is counted as a vehicle. One practical problem arises because of detector relay contact bouncing in the periods of transition between states which produce multiple changes in bits of input data. The next step in the program is "debounce delay", an interval introduced to permit successive scans of the processor ports during the same program cycle in order to determine whether any change in voltage level is the result of detector relay contact bouncing, which represents a spurious change of state of the contacts rather than an actual change of state of the detector outputs representing a vehicle entering or leaving the zone over a detector and thus, a vehicle which should be counted. In the present case, a vehicle is counted when it leaves the zone over the detector in the lane the vehicle is traveling. That is reflected by a negative transition of the pulse produced by the detector relay contacts, from a positive voltage level to a zero voltage level (a "1" to a "0"). Under program control the CPU looks for the trailing edge of the detector contact output pulse in each lane, ignores pulse oscillations caused by contact bouncing as spurious signals, and increments a counter in response to each such negative transition or trailing edge of a pulse to count vehicles.

In some cases of traffic surveillance, it is desired to accumulate vehicle count in groups of lanes rather than in separate lanes. In the program shown on FIG. 5A, provision is included for subdividing the 12 lanes of a highway into groups of lanes as desired, using a "category counter register" to accumulate vehicle count in such lanes. A "category counter register" is successively incremented each program cycle to store the vehicle count for multiple lanes. After the count for that group of lanes has been accumulated for a period of time, the accumulated count is transferred to data storage. The counter and register functions, as well as the data storage function, is served by locations in memory, in the preferred form of the invention, rather than by separate discrete components, and the locations in memory are pointed to by pointers.

As shown in FIG. 5A, each program cycle the 12 input/output ports of the processor are successively scanned (input 12 contacts—input 12 contacts) after an interval described as "debounce delay", until any oscillation of the relay contacts has passed, and the contents of the accumulator have stabilized for that program cycle. Then the question is asked "Any new contacts?". In this step, the contents of the accumulator are compared with the contents of the accumulator the previous program cycle to determine whether any bit in the accumulator register has changed. If "yes", the program enters a sequence to count vehicles in groups of lanes. The first step is to "rotate contacts". The accumulator is rotated, i.e., a shift operation is performed to transfer the contents of the accumulator bit-by-bit in serial order to the link, a one-bit register, and under program control each bit in the accumulator is compared with the corresponding bit in the accumulator during the previous cycle to determine any change; the circuitry performs the "Exclusive OR" function and produces a "high" or "1" output responsive to any such change which represents a vehicle to be counted. Thus, after the step "rotate contacts", there is shown the step "increment group counter". The group counter is utilized to keep track of the number of lanes making up a group. Thus, if the lanes are to be grouped into two 6-lane groups, the group counter is incremented twice as the accumulator is rotated once. If the lanes are to be divided into four 3-lane groups, the group counter is incremented three times while the total 12 bits of the accumulator are shifted through the link. Each sub-sequence, therefore, the group counter is incremented and the question is asked "End of group?". If "no", the question is asked "contact high?". As noted above, if any bit of the accumulator contents when compared with the same bit the preceding cycle shows a change representing a vehicle to be counted, the "contact high?" question is answered "yes" and the category counter register is incremented. If the answer is "no", representing for that particular lane no vehicle to be counted, the sub-sequence loops and the next bit of the accumulator is looked at. At the end of each group, the "end of group?" question is answered "yes". The category pointer is then incremented so that the count for the next subgroup of lanes will be stored in a new location in memory serving the "category counter register" function. At the end of the categories, the counter and pointer are reset and the program returns to the start.

It will thus be seen that in addition to vehicle count, a classification function is performed in that the vehicle counts are, or may be, classified into groups of lanes as desired.

As shown in FIGS. 5A-5B, the reading of data from the recorder unit memory by the reader instrument, in response to a read command from the reader instrument, is interleaved with the registering and recording of vehicle count in the recorder unit memory. The timing of each cycle of scanning input/output ports of the processor, and counting vehicles represented by a change in state of the voltage level appearing on any one or more of the input/output ports, is established by the internal timing circuitry of the CPU, and with a standard CPU such as the Intersil 6100 may be set to about one millisecond. The program gives priority to counting vehicles over reading stored data and, therefore, until a check of the detector contacts indicates no change in state of any one of the contacts (any new contacts?—no), the program loops; when a check of the detector contacts (as represented by the voltage levels in the data input/output ports) indicates "no change", the program exits from the loop (or does not enter the loop) and continues to the segment shown on FIG. 5B where any read command from the reader instrument results in a read operation.

In this program, the data stored in memory is read in small blocks, for example, in 11-bit characters each program cycle. It will be seen that depending on traffic flow conditions, the gaps in vehicle flow may be shorter or longer. The transfer of data takes place in 11-bit characters for as many program cycles as fit into a gap, and the read process is interrupted and the program waits for the next gap before the read process continues. In this manner, the counting and recording process is not slowed down or interrupted for reading, and missing a vehicle is avoided.

During heavy traffic flow conditions, the readout process proceeds at a slow rate and may require several minutes to fully read out all data stored in the memory of the recorder unit, interleaved during such gaps in vehicle flow. Under lighter traffic flow conditions, the read process will proceed more rapidly since many more characters may be read out without interruption during the longer gaps in vehicle flow.

As shown in FIG. 5B, the program proceeds with the input/output control port of the CPU being checked for commands from the reader instrument. The next step is the "clock ready?". The program branches once each minute to increment the clock counter. At the end of each hour (or other shorter or longer time interval, as desired), the contents of the category counter registers each having the accumulated vehicle count for a group of lanes, are transferred to memory locations via the data table pointer, the data table pointer is incremented and the program returns to reiterate the counting sequence.

If the answer to the "clock ready?" question is "no", and a read flag is set by a read command received from the reader instrument, one character composed of multiple bits of data (for example, the 11-bit character mentioned hereinbefore) stored in recorder unit memory, is transferred to the reader instrument. The particular bits of data transferred are addressed by a character pointer, which is incremented following each character transfer to address the next set of bits to be transferred. With the character pointer at a terminator, representing all data transferred, the read flag is cleared.

The program, as shown in FIG. 5B, also contemplates transfer from the reader instrument of other control signals or commands besides read commands, and operation of the recorder unit under program control in response to such other control signals or commands. Thus, as shown in FIG. 5B, with the read flag not set, and the reader status low, the program enters the reader instrument program on FIG. 10B as indicated by the off-page locator "B" at the bottom of FIG. 5B. With the reader status high, the program returns to the counting sequence commencing with the "input 12 contact" step of FIG. 5A.

Figure 10A:
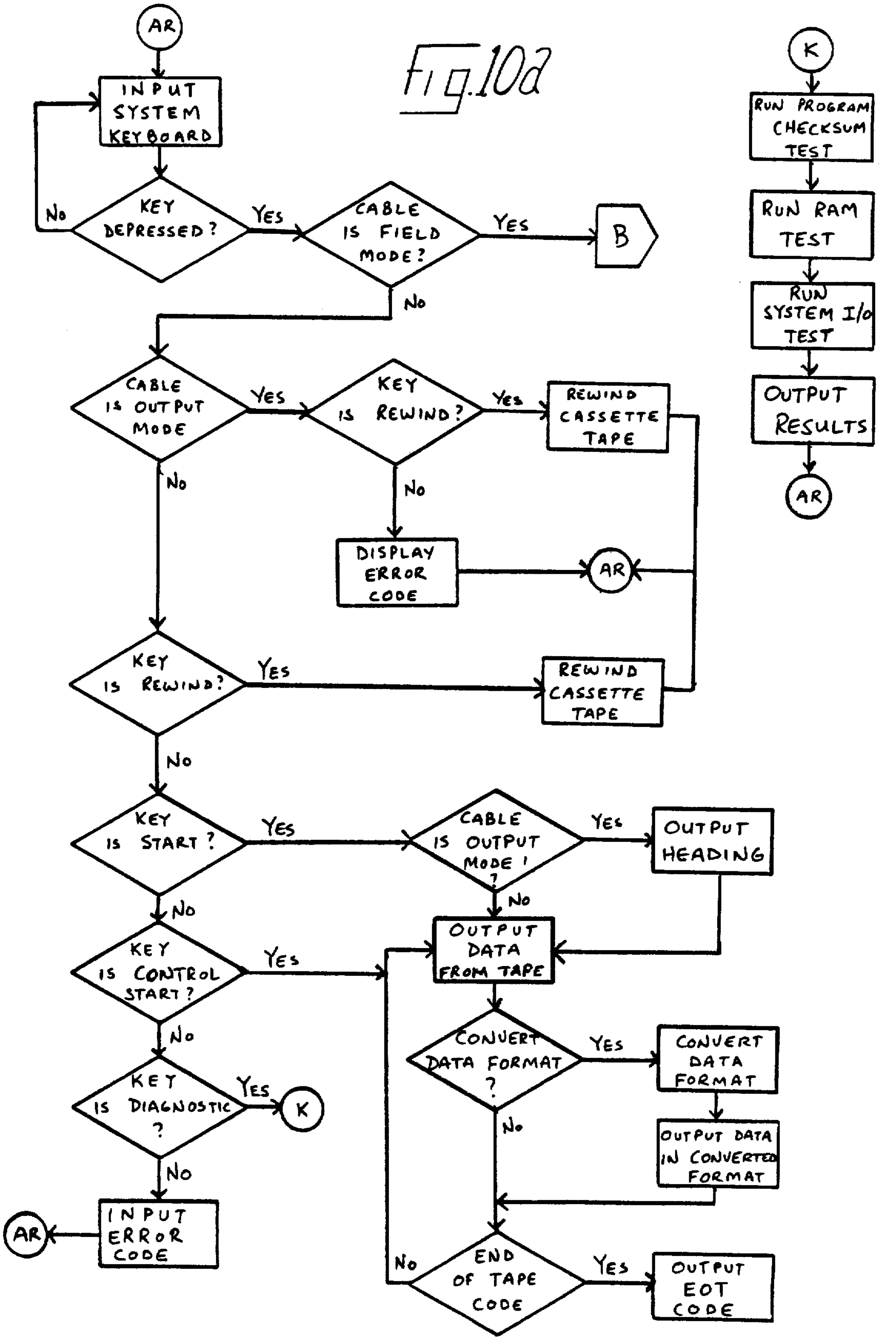
FIGS. 10A-10B depict a flow diagram which the data processing system of the reader instrument of this invention utilizes.
Figure 10B:
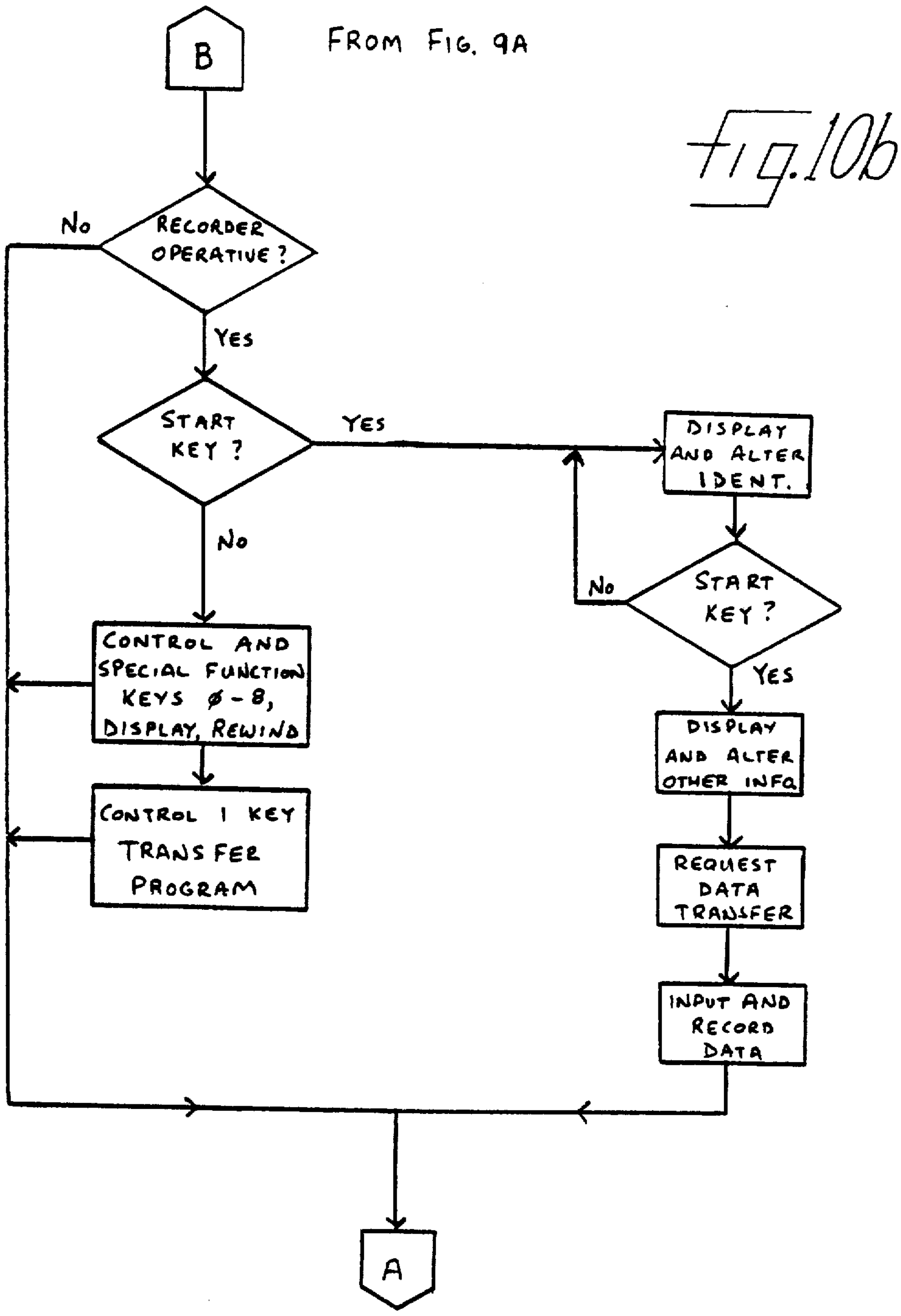

Turning to FIG. 10B, with a reader instrument connected to the recorder unit and the cable "field mode", the program sequence is there shown for the reader instrument to carry out its various functions in conjunction with a recorder unit. For example, with the "start key" of the reader instrument not actuated, and the "display key" of the reader instrument actuated, the mode is entered for active count register display from the recorder unit without interrupting the ongoing recording mode of the unit.

With the start key actuated, the reader instrument is operated to execute a series of steps leading to transfer of stored data from the recorder unit memory and re-recording on the cassette tape of the recording device of the reader instrument. The sequence of steps, in response to successive actuating of the start key, contemplates displaying by means of the keyboard, identification, time and date data and recording such data on the cassette tape, followed by the steps of requesting data transfer and inputting and recording the traffic data on the cassette tape as shown on FIG. 10B. This sequence also contemplates altering the set-up date, after the traffic data transfer and recording process for resetting the recorder unit for subsequent processing and recording of traffic data.

The illustrated programs for the reader instrument also provide for special operations as shown on FIG. 10B. Thus, with the "start key" not actuated and the "rewind key" actuated, the subprocess is executed of recording an end of tape (EOT) code on the cassette tape in the recording device and rewinding the cassette tape. Control keys ϕ–8 when actuated cause the execution of different processes. For example, "control start" key when actuated calls for a program transfer to the recording unit, to change the program stored in its memory and thereby change the type of parameter data derived and stored in the recorder unit. Operation of "control 3" key calls for direct data transfer from the recorder unit memory with the data displayed on the reader instrument display device. By actuating "control 2" a signal is transmitted to the recorder unit to speed up the data transfer step and immediately cause accumulated data in the lane registers to be transferred to memory. Actuating control keys 4–8 calls for operations such as time display, diagnostic procedures, and recorder unit adjustments.

Figure 8:
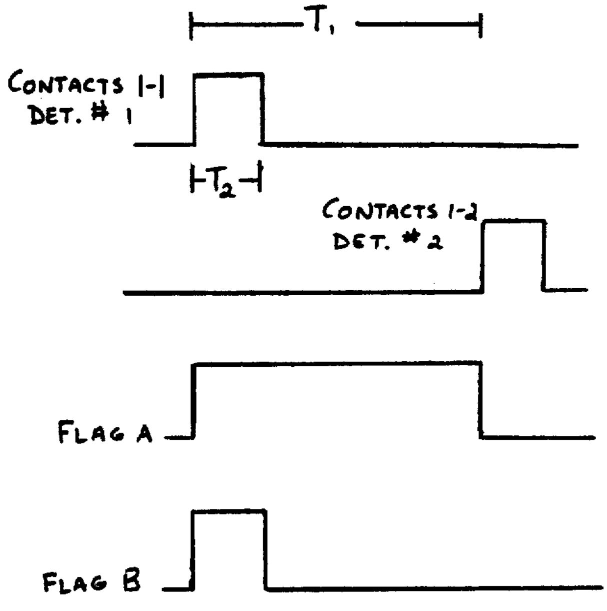
FIG. 8 illustrates diagrammatically the relation between detector outputs and flag control signals.
Figure 9A:
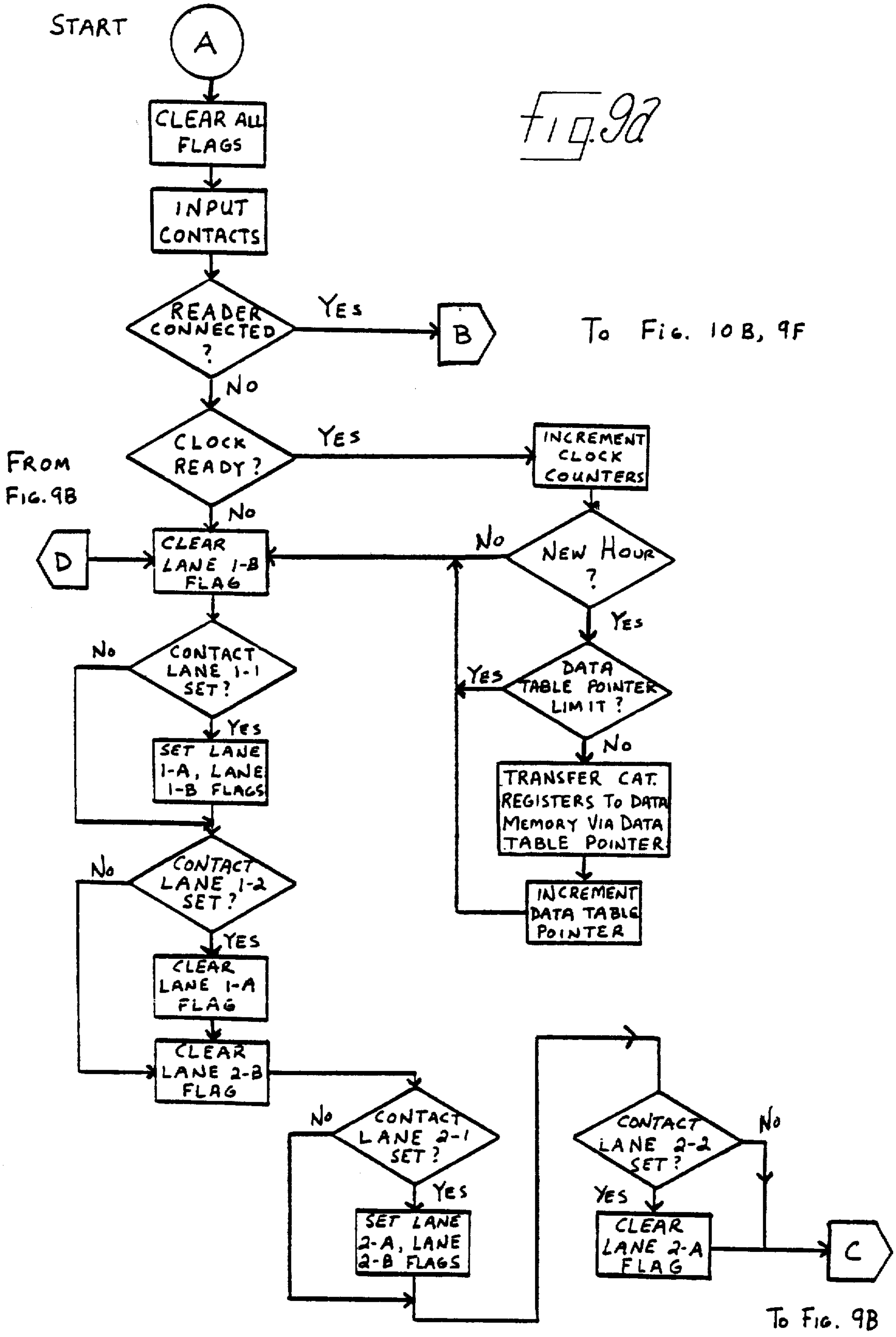
FIGS. 9A-9D depict a flow diagram for a recorder unit program, showing in more detail than in FIG. 6, a sequence for deriving and storing vehicle classification data.
Figure 9B:
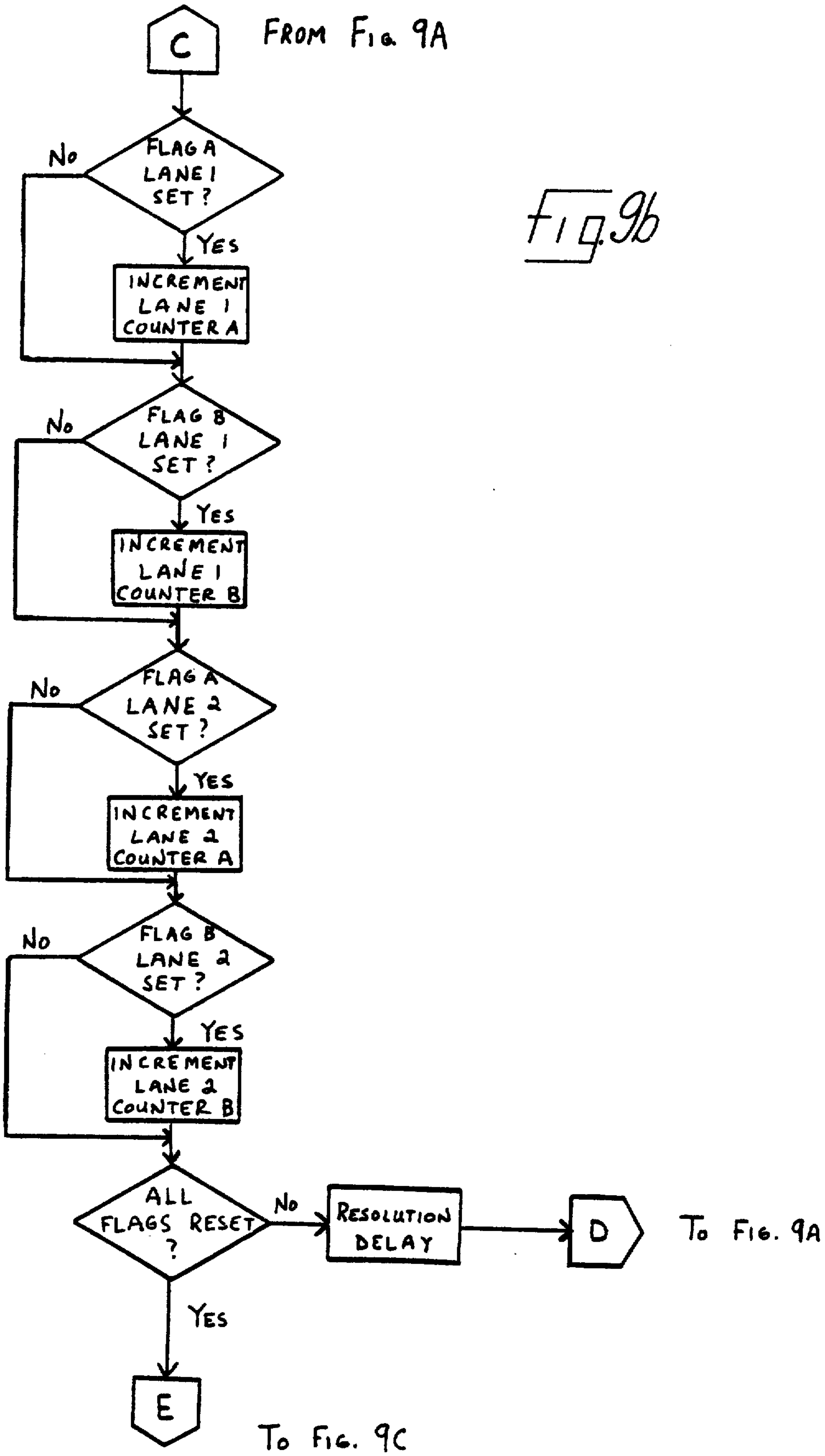
Figure 9C:
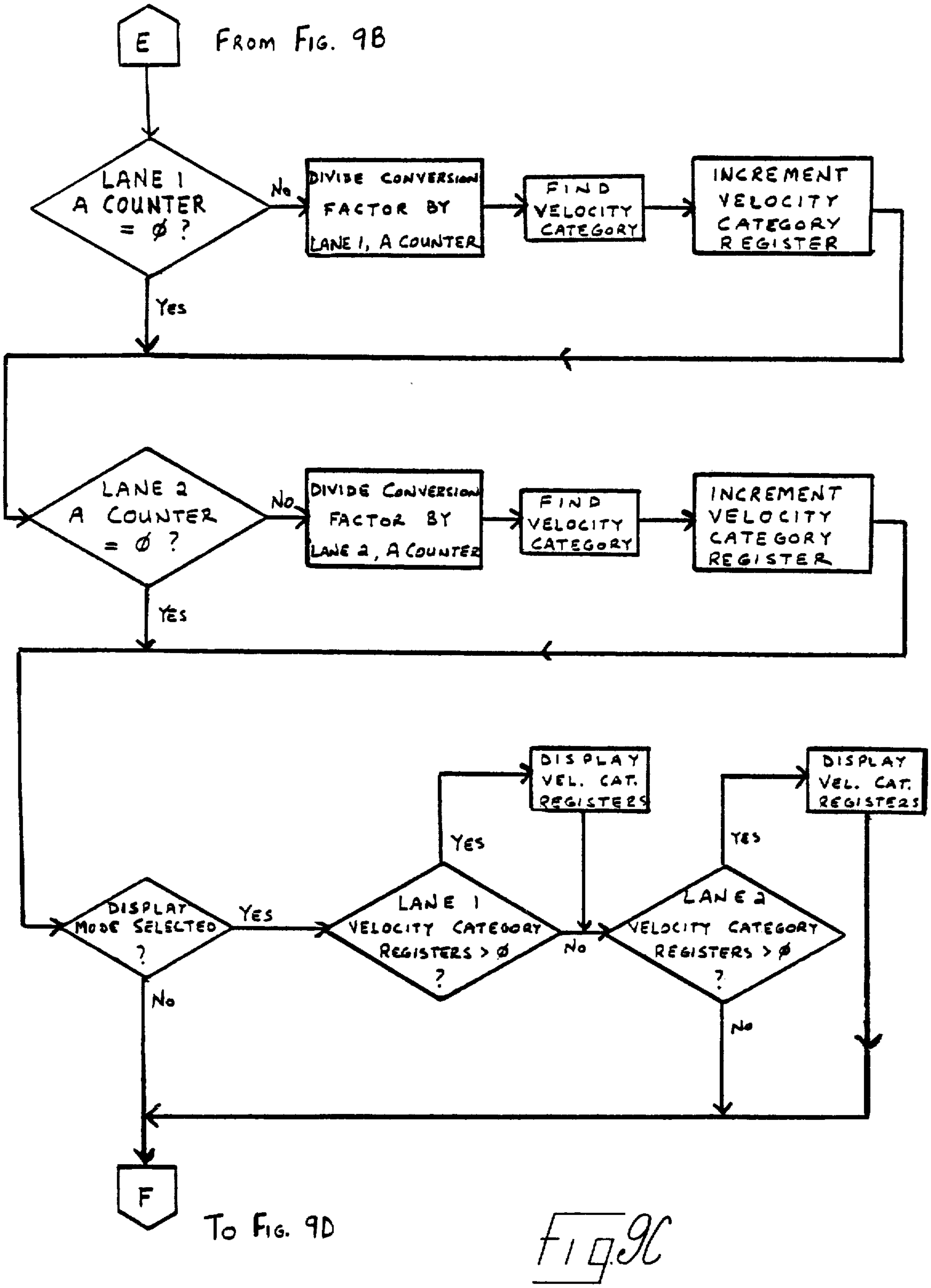

Referring now to FIG. 6, a program for operating the recorder unit to derive more complex traffic data, and to classify and store such data in semi-conductor memory, is shown in this general flow chart. A more detailed flow chart of the same program is shown in FIGS. 9A–9B. To derive as shown in FIGS. 6, 9A–9B, vehicle velocities and length, dual detectors in each of two highway lanes provide vehicle representing signals to the recorder unit. The concept behind the program is to set for each lane a control flag for the duration of time a vehicle is over the first detector, and another control flag for the duration of time required for a vehicle to travel from the leading edge of the first detector in a lane (in the direction of travel of the vehicle) to the leading edge of the second detector in the same lane. The setting and clearing of such flags is diagrammatically illustrated in FIG. 8. Utilizing such flag signals in the course of the program, vehicle velocity and length traffic data is derived, classified in categories, and stored in memory.

Another consideration in the establishment of this program for deriving velocity and length data and classifying and storing such data, is to process the signals representing vehicles in both lanes and store intermediate results based on those signals, and after the vehicles have cleared the zones over the detectors, to calculate and derive the desired traffic data (velocity, length) based on the intermediate results. This contemplates that with all foreseeable traffic flow conditions on a two-lane highway, for example, a "window" will be provided during which vehicles in both lanes have cleared the zones over the detectors and during that "window" before following vehicles arrive over the detectors, the vehicle velocity and length is calculated, classified and stored. Thus, referring to FIG. 6, at the start of the program, the vehicle representing signals from the detectors in lanes 1 and 2 are routed by means of the input/output circuitry to input ports of the CPU. This means in the case where dual detectors are in each of two highway lanes, a signal may be produced by one or the other of the two detectors in each lane. It is not contemplated that two vehicles will be actuating the dual detectors in a lane since only 16 feet separates the detectors.

The next step in the program, as shown in FIG. 6 and also FIG. 9A, is the question "reader connected?". If "yes", the program branches to the reader instrument program on FIG. 10B. With the reader instrument not connected, the question is asked "new hour". This program contemplates accumulating classification data for one hour, and at the end of each hour transferring data stored in registers to new locations in memory. The next processing step, generally indicated in FIG. 6 as "Increment Lane Counters, etc.", involves incrementing lane counters each cycle of a program loop which is precisely timed to take a fixed period established for vehicle classification systems, preferably on the order of 1.34 milliseconds, which program loop is not terminated until the vehicles in both lanes have cleared both detectors, indicated by the decision point "All Flags Reset?" in FIG. 9B. In this program loop, as shown on FIG. 6 and FIGS. 9A–9B, the lane counter B is incremented successively each cycle, for the period of time the B flag is set, as shown in FIG. 8, so that the number accumulated in the B counter represents the duration of time a vehicle is over the first detector in lane 1; lane counter A is incremented each cycle of the program loop for the period of time the A flag is set, so that the number accumulated in the A counter represents the duration of time of travel for the same vehicle to travel between the leading edge of the first detector in the lane to the leading edge of the second detector in the lane. Separate A and B lane counters are provided for both lanes. The program exits from the loop when a vehicle in one lane has cleared the zones over the detectors, or when vehicles are traveling past the detectors in both lanes, when both vehicles have cleared the detectors in both lanes.

Thus, after the lane counter incrementing process, the question is asked "vehicles cleared both detectors?".

In the more detailed flow chart of the same program in FIGS. 9A–9B, at the corresponding point in the program the question asked is "All Flags Reset?". After vehicles have cleared both detectors in both lanes, and the program exits from the loop, the processes are executed of calculating the velocity of a vehicle in each lane, and based on the velocity calculation, calculating the length of the vehicle knowing the given distance between the detectors. The velocity is classified and separate registers for each velocity category are incremented; the vehicle length is classified and separate length registers for each category are incremented. Each hour, all velocity and length category registers are transferred to memory as shown by the flow chart.

Turning now to FIG. 9A, for a more detailed illustration of the program steps, the program as there shown includes as a first step "clear all flags" and next "input detector contacts". As noted earlier, when connected to dual detectors in two lanes, it is expected that either one but not both of the detectors in each lane may be actuated during any given machine cycle. The next question is "reader connected?" and if "yes", the reader instrument program, depicted on FIG. 10B, is entered. If "no", the question is asked "clock ready?", and if the answer is "yes", the steps are executed, first of incrementing the clock counter and then, if a new hour, executing the step of transferring to different memory locations the accumulated counts in the category registers, a data table pointer serving the function of addressing the desired locations in memory. The data table pointer is incremented, so that the data table pointer has the starting address for the memory locations where the registers are to be transferred to the end of the next hour. The program loop exits at the step "clear lane 1-B flag".

Referring to FIG. 8, the A flag is set for the duration of time of travel of a vehicle from the leading edge of the first detector in the lane to the leading edge of the second detector in the same lane. The B flag is set for the duration of time for the vehicle to pass the first detector in the lane. Referring again to FIG. 9A, the step "clear lane 1-B flag" refers to the clearing of the B flag for lane 1. Next the question is asked "lane 1 contact 1-1 set?"; this refers to the detector #1 contacts in lane 1. If the answer is "yes", both A and B flags for lane 1 are set (as shown in FIG. 8) and the question is then asked "lane 1 contact 1-2 set?", referring to the detector #2 contacts in lane 1. If the answer is "yes", since the detector #2 contacts are set well after a vehicle has left the zone of detector #1, the step is executed to clear the A flag. Thereafter, the step is executed to clear the B flag for lane 2. The question is then asked "lane 2 contact 2-1 set?", referring to the detector #1 contacts in lane 2. If the answer is "yes", both the A and B flags for lane 2 are set and then the question is asked "lane 2 contact 2-2 set?", referring to the detector #2 contacts in lane 2. If those contacts are set, representing that a vehicle has left the first detector and has actuated the second detector, the next step is executed "clear A flag, lane 2".

In summary, to this point in the program, the contacts for the dual detectors in both lanes have been scanned. If a vehicle is passing the first detector (detector #1) in either lane, resulting in the first detector contacts being closed, the B flag for that lane is set, as indicated in FIG. 8. If a vehicle has entered the zone of the second detector in either lane, thereby closing the second detector contacts, the A flag for that lane, which was set when the vehicle actuated the first detector, is reset. The steps of setting and resetting flags are iterated every subcycle represented by the program loop, which is a predetermined and fixed period, preferably 1.34 milliseconds so that, as indicated in FIG. 8, the A flag signal is maintained for the duration of time $T_1$ while the B flag signal is maintained for only the duration of time $T_2$. The continuation of the flow chart on FIG. 9B reveals the successive steps of incrementing lane counters in response to set flags. Thus, the question is asked "Flag A, lane 1 set?". If "yes", lane 1 counter A is incremented. Then the question is asked "Flag B, lane 1 set?". If the answer is "yes", the lane 1 counter B is incremented. Similarly, the A and B flags for lane 2 are tested and the lane count is incremented with the flags set. The program loop earlier referred to is started at the decision point "all flags reset?". If the answer is "no" indicating that for either lanes 1 or 2, one or the other of the A or B flags is set, then the program returns to the step "clear lanes 1-B flag" of FIG. 9A, after a resolution delay determined by the desired resolution of the detector signals. Recognizing that the program loop involves a passing through the steps on FIG. 9A each 1.34 milliseconds, it will be seen that each lane counter is incremented each 1.34 milliseconds for as long as the corresponding lane flags are set. Thus, the A counter for each lane will be incremented for as long as the A flag is set and the B counter in the same lane will be incremented for as long as the B flag is set. The number of counts accumulated in each counter will, therefore, represent in the case of the A counter, the time $T_1$, and in the case of the B counter, the time $T_2$. With all flags reset, representing that vehicles have left the zones of the dual detectors in both lanes, the program proceeds to the program segment flow charted on FIG. 9C.

As there indicated, the first step involves the question "lane 1-A counter equals zero?". If the A counter for lane 1 contains no number, the next three steps are skipped. If the A counter for lane 1 contains a number, the program proceeds through a calculation to derive vehicle velocity for a vehicle in lane 1, by dividing a conversion factor by the number accumulated in the A counter for lane 1. The conversion factor is based upon the known distance between the leading edge of the two detectors in lane 1 described earlier as substantially 16 feet, and thereby converts the number in the A counter which represents accumulated time in increments of 1.34 milliseconds, to velocity in m.p.h. The next step is to find the velocity category—usual velocity categories are 35–45, 45–55, 55–65, over 65 and after the particular category has been found, the category register which fits is incremented as the next step in the program.

The program then proceeds to a velocity derivation for a vehicle in lane 2. Thus, the question is asked "lane 2-A counter equals zero?". If the A counter for lane 2 contains a number, the same process steps are followed to find the vehicle velocity represented by the number in the counter, and to increment the category register which fits. Following the incrementing of a velocity register for lane 2, the program reaches a decision point where the question is asked "display mode selected?". This is included to demonstrate that the recorder unit functions, upon command from the reader instrument, to enter and execute a display mode sequence without interruption of the normal recording function. Thus, if upon reader command the answer is "yes", the accumulated count in the A registers in both lanes 1 and 2 will be displayed, and the program will then continue on to the length determination and classification steps flow charted on FIG. 9D. Thus, as indicated on FIG. 9D, the question is asked "lane 1-A counter equals zero?". If the A counter for lane 1 contains a number, the step is executed of dividing the number in the lane 1-A counter by 16, the distance between the leading edge of detector #1 and the leading edge of detector #2, in order to provide a number "X" representing velocity. The next steps involves the calculation of dividing the number in lane 1-B counter by the number X, the result of that calculation being the length of the vehicle. The next step is to find the length category and thereafter to increment the length category register which fits. As desired, the length category registers may be solely for trucks and cars, or may include various categories for different length trucks, etc.

Figure 9D:
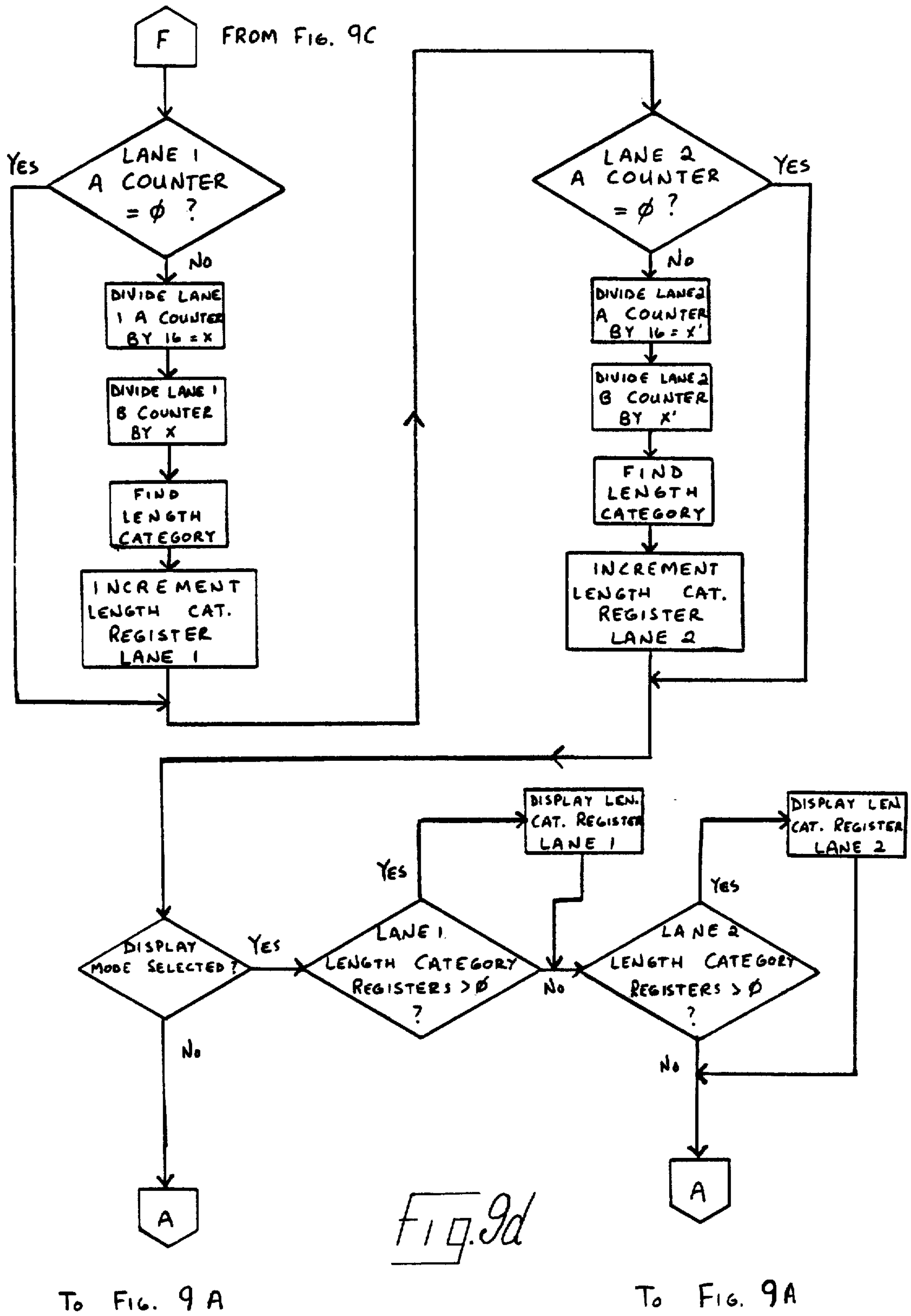

Turning to FIG. 9D, a similar sequence of steps to derive length data and classification in categories is carried out for lane 2. Thus, the lane 2-A counter is tested and if it contains a number, the number is divided by 16 to produce an intermediate result "X'". Next, the number in lane 2-B counter is divided by X' to provide vehicle length. The length category is found and the appropriate length category register incremented, for lane 2. Again, the program illustrates that a display mode may be selected, on command from the reader instrument and entered to display the accumulated total in the length categroy registers for lanes 1 and 2. It will be observed that with the display mode entered, there will be visually shown on the reader instrument display, the lengths of vehicles as they pass on the highway, without interrupting the ongoing recording function of the recorder unit. After the display mode sequence is completed, the program returns to the start point on FIG. 9A.

Referring to FIG. 10A, a flow chart of certain operations of the reader instrument carried out under program control is there illustrated. With the power turned on in the reader instrument, the reader instrument as well as the recorder unit being self-powered by means of its own battery source, the keyboard matrix is scanned and the test is made whether the cable is "field mode", i.e., connected to a recorder unit. If "yes", as earlier noted, the recorder unit operation to process signals from detectors and record traffic data may continue without interruption or, as shown in FIG. 10B, with the start key of the reader instrument actuated, a sub-routine may be entered for displaying and altering identification of the recorder unit as a preliminary to transferring data from the recorder unit memory to the cassette tape in the reader instrument, followed by data transfer and recording. As also shown in FIG. 10B, with the cable field mode and the recorder operative, using control and special function keys on the reader instrument, various monitoring and diagnostic steps and procedures may be carried out such as requesting time data from the recorder unit and displaying it on the reader instrument display device, and other like functions. One major function involves transfer of programs from semi-conductor memory of the reader instrument to semi-conductor memory of the recorder unit. One of the control keys, illustratively the "control 1" key of the reader instrument, as indicated in FIG. 10B, when actuated causes the reader instrument CPU to operate under program control to so transfer program data from the reader instrument to the recorder unit.

Referring again to FIG. 10A, with the cable of the reader instrument "output mode", the system is conditioned for transfer of recorded data from the reader instrument cassette tape. This is carried out, as indicated diagrammatically in FIG. 2, to transfer the recorded data previously collected from the recorder units and recorded on the cassette tape of the reader instrument, to another cassette tape, a magnetic disk or magnetic tape or other storage unit at a processor center. Thus, referring to FIG. 10A, after the cassette tape has been rewound, and with the start key depressed, and the cable "output mode 1", transfer of the data on the cassette tape begins with the output header information followed by data from the cassette tape. For this purpose, the recording device 44 of the reader instrument 24 includes, preferably, a tape deck provided with tape engaging heads and associated mechanism and circuitry for both recording data on the tape stored in cassettes and reading data from the tape. Connections through the input/output circuitry 54 are provided from the recording device 44 to an output terminal 56 on the reader instrument, for transmitting data read from the tape to peripheral devices, as shown in FIG. 3.

As indicated, the data may be transferred from the tape directly to peripheral devices, or, as an option, the data on the tape may be converted to a different format. For example, the data may be converted to a format readable by a computer by means of the reader instrument CPU operating under program control stored in the program storage means of the reader instrument. The reformated data may be fed directly to a computer or transferred to a magnetic disk or magnetic tape storage device and re-recorded in the altered format. Whether transferred in the format originally recorded on the cassette tape or in an altered format, after transfer of the data and the generation of the end of the tape code (EOT), the process exits from the data output mode and returns, as indicated on FIG. 10A, to the start of the program cycle. Other program checking and diagnostic sub-routines are carried out under control of the keyboard, as indicated in the flow chart on FIGS. 10A and 10B.

Thus, the system of this invention provides a recorder unit 20 and reader instrument 24 each having programmable data processors 46, 52 (CPU's) which provide control means to carry out the functions of the respective units. Separate programs are stored in the recorder unit memory 50 for operating the recorder unit control means 46 and in the reader instrument memory 53 for operating the reader instrument control means 52. The detector contacts 1-1, 1-2, etc. shown in FIG. 7, may be mounted in a separate enclosure but are preferably mounted inside the recorder unit case and connected to the I/O circuitry 48. Signals produced by the detector contacts in response to vehicle or "event" signals from the detectors or sensors, illustratively inductance loops in roadway lanes (FIGS. 1 and 3), are carried by I/O circuitry 48 to the input/output ports of the recorder unit CPU 46.

Referring to FIGS. 3 and 4A, the data processor control means 46 of the recorder unit 20 includes an arithmetic and logical means (ALU) for deriving data (such as count data used in traffic surveillance) in response to input signals received at the CPU input/output ports, in accordance with instructions of a program stored in the memory means 50. The control means 46 and the memory means 50 are connected for transferring instructions to the control means 46 and for transferring derived count data to the memory means 50. A reader receptacle 30 is also on the outside of the recorder unit case for a connect cable 26 leading to the reader instrument 24. The control means 46 includes means for reading count data stored in the memory means 50 in accordance with the program of instructions in response to read commands received from the reader instrument 24, and for transferring count data so read to the reader receptacle 30. The portable reader instrument 24 which is separate from the recorder unit 20, as shown in FIG. 1, has a receptacle 58 on the outside for the connect cable 26.

The data processor control means 52 of the reader instrument 24 is effective under a program of instructions from the memory means 53 to generate display, record and read commands in response to selective activation of the keys of the keyboard 36, and for transmitting read commands over the connect cable 26 to the recorder unit control means 46. The reader instrument control means 46 also includes means actuated in response to record commands for operating the recording device 44 for re-recording on record medium (tape stored in cassettes), count data received from the memory means 50 of the recorder unit 20 in response to such read commands. The control means 52 of the reader instrument is also operable to actuate the display 42 to display count data in response to such display commands.

Identification Codes for Field Data

Since the recorder unit is operable, depending on its programs, to record in memory widely varying kinds of data, it has been found important in carrying out the invention to identify the data and record identification codes together with the field collected data to facilitate subsequent processing of the data. For this purpose, it is preferred to record codes identifiying the data when the data is read by the reader instrument from the recorder unit and re-recorded on the recording medium used in the reader instrument.

Similarly, where the recorder unit is connected via telephone lines or other fixed lines or cables to peripheral equipment such as computers or recording machines (as shown in the upper portion of FIG. 2), it is preferred to transmit together with the field collected data, codes identifying the data being transmitted. It should be clear that unless the field collected data is fully identified, it may be more difficult or impossible to further process the data.

Accordingly, to facilitate further processing, the data collected in the field and recorded in the recorder unit memory is post processed in the reader instrument. This is preferably achieved by storing coded descriptions of the data in a header preceeding the data recorded on the cassette tape in the reader instrument.

For example, in the case of traffic data, space may be allocated in the header for description codes designating type of data. Previously, it has been explained how "velocity" data may be derived; one description code may be assigned to "velocity" data; it has been explained how "vehicle length" data may be derived, and a description code may be assigned to "vehicle length" data. Similarly description codes may be assigned to vehicle count data, vehicle type (number of axles) data, combination velocity and direction count data, etc. Other data identifying description codes may be included in the header such as codes identifying number of lanes, highway traffic covered by the data, time interval for the recorded count data, etc.

It will thus be clear that the description codes identifying the data recorded on the cassette will be read as part of the header information as data is read out from the cassette tape by the reader instrument. As indicated above, the data on the tape may be transferred directly to peripheral devices, or, the data on the tape may be converted to a different format than that used for its recording. It is highly advantageous to transmit the data in a format readable by peripheral equipment, one exemplary format being serial ASCII code, with logic levels conforming to EIA standards. When formated in ASCII code, the header and data read from a cassette tape may operate a printing device directly or may be read by computing devices programmed to receive the data in that format.

Similarly, in cases where a recorder unit is connected via cables or telephone lines directly to peripheral equipment, when a read program is transmitted to the recorder unit to read data from the memory of the recorder unit, the data may be read with description codes in a header portion preceeding the data and transmitted directly to peripheral equipment.

A typical format of traffic data is shown below, particularly to illustrate header organization including printer operating symbols and header titles, being understood that the header and data, and the non-printing characters, preferably are transmitted in code from the reader instrument when sent for further processing. In this case, one field following the header title "IDENT" is allocated for codes designating the kind of data following the header.

```
(CR) (LF) (LF) (LF) (LF)
STATION: ƀƀ1234ƀƀƀƀIDENT: 2415ƀƀƀƀHOUR: ƀƀƀ12ƀƀƀƀDATE: ƀ1120ƀƀƀƀTIME: ƀ 841ƀƀƀƀƀƀƀƀ        (CR) (LF)
(CR) (LF)
HOUR: ƀƀƀƀCHANNEL: CR LF
      0   1     2     3     4     5     6     7     8     9     10    11    12    (CR) (LF)
(CR) (LF)
(CR) (LF)
      2   0     0     0     0   } (CR) (LF)
      3   0     0     0     0   } (CR) (LF)
      4   0     0     0     0   } (CR) (LF)
      5   0     0     0     0   } (CR) (LF)
      6   0     0     0     0   } (CR) (LF)
      7   0     0     0     0   } (CR) (LF)
      8   0     0     0     0   } (CR) (LF)
      9   0     0     0     0   } (CR) (LF)
```

-continued

| |
|---|
| 10 (BELL) |

Notes:
1. The bracket (}) character appears at the end of a line only if it is the end of the hour.
2. There may be more than one line of data per hour (if time interval is 15 minutes, for example, there will be four lines of data per hour.)
3. All header codes, including Station, IDENT, etc., are at least four characters with spaces replacing leading zeroes.
4. The number of data per line is variable, depending on the recorder program originating the data. The example above shows four data channels.
5. Non-printing characters
(CR) Carriage return
(LF) Line Feed
ƀ Space

We claim as our invention:

1. Apparatus for counting and recording the count of events at a surveillance site comprising, in combination:

a recorder unit adapted to be located at a surveillance site and connected to detector means providing successive detector signals responsive to successive actuations of said detector means by successive events, and a portable reader instrument separate from and adapted to be connected to said recorder unit, said recorder unit including semi-conductor memory means having separate locations for storage of data and instructions of a program, means including a programmable data processor connected to and operable under the control of a program of instructions stored in said memory means to function in a recording mode, a time of day clock means connected to supply timing signals on a real time basis to said data processor, said data processor including an arithmetic and logic unit for performing computational and decisional processes in a sequence determined by said program to count said events in response to said detector signals, and to accumulate said count as data in separate locations in said memory means for separate real time periods based upon said timing signals, said reader instrument having means for connection to said recorder unit, a recording device, and manually operable means for generating read commands and for transmitting said read commands over said connection means to said recorder unit, said data processor of said recorder unit being operable under the control of said program to respond to said read commands and shift from a recording mode to a read mode and transmit count data accumulated in separate locations in said memory means of said recorder unit through said connection means to said reader instrument, said reader instrument including means for operating said recording device to re-record accumulated count data received from said reader unit.

2. Apparatus for counting and recording count data according to claim 1, said reader instrument further including means for storing programs for said recorder unit, and means responsive to said manually operable means for transmitting commands to said recorder unit to shift said means including said data processor from a recording mode to a reprogramming mode and for transmitting said programs to said recorder unit, said recorder unit including means responsive to said commands for receiving and loading said transmitted programs into said memory means.

3. Apparatus for counting and recording the count of events at a surveillance site comprising, in combination:

a recorder unit adapted to be set at a surveillance site and connected to detector means providing detector signals responsive to events, and a reader instrument separate from and adapted to be connected to said recorder unit, said recorder unit including (1) storage means for data and for program instructions, (2) input/output circuit means for receiving said detector signals, and (3) a programmable data processor means connected to said storage means and said input/output circuit means, and operable under the control of a program of said instructions to count events in response to said detector signals and to function in a recording mode and record said events as count data, and to accumulate said count data in separate locations in said storage means, and (4) a terminal providing means for interconnection between said recorder unit and said reader instrument, said input/output circuit means providing a connection for transmitting count data and read commands between said data processor means and said terminal, said reader instrument having (a) means for connection to said terminal of said recorder unit, (b) a recording device, and (c) manually operable means for generating read commands and for transmitting said read commands over said connection means and via said terminal to said recorder unit input/output means, said data processor means of said recorder unit being operable in response to said read commands to shift from a recording mode to a read mode and transmit under the control of a program accumulated count data from said data storage means through said input/output means to said terminal, said reader instrument including (d) means for recording in said recording device accumulated count data received through said terminal from said recorder unit.

4. Apparatus for counting and recording according to claim 3, wherein said reader instrument includes a programmable data processor, semi-conductor memory means for storing a program of instructions for said reader instrument data processor, a display device, and input/output circuit means interfacing said reader instrument connection means, recording device, data processor, memory means, and display device; said reader instrument data processor being operable under the control of a program of instructions stored in said reader instrument memory means to generate and transmit read commands to said recorder unit and to operate said display device to display and said recording device to record count data received from said recorder unit memory means in response to said read commands.

5. Apparatus according to claim 1 for counting, classifying and recording traffic data, said detector means including a pair of detectors in each lane of a multiple lane roadway spaced a given distance apart, and said detectors in each lane providing separate signals including:

(1) a first signal representing the time duration for a vehicle to pass one of said detectors, and (2) a second signal representing the time duration for the same vehicle to pass the other detector in a lane, said recorder unit data processor means being operable under the control of a program:

(1) in response to said second signal, and with said given spacing distance, to count each passing vehicle, to derive the velocity of each said passing vehicle, and to classify said passing vehicles according to velocity and accumulate in said data storage means in velocity categories, the count of all vehicles passing in each lane; and (2) in response to said first signal, and having derived the vehicle velocity, to classify said passing vehicles according to length and accumulate in said data storage means in length categories, the count of all vehicles passing in each lane.

6. Apparatus for counting and recording the count of events at a surveillance site comprising, in combination:

a recorder unit adapted to be located at a surveillance site and connected to detector means providing successive detector signals responsive to actuations of said detector means by successive events, and a portable reader instrument separate from and adapted to be connected to said recorder unit, said recorder unit including memory means for data and for instructions of a program, means including a programmable data processor connected to and operable under the control of a program of instructions stored in said memory means to function in a recording mode, said data processor including an arithmetic and logic unit for performing computational and decisional processes in a sequence determined by said program to count said events in response to said detector signals, and to accumulate said count as data in said memory means, said reader instrument having means for connection to said recorder unit, a visual display device, a recording device, and manually operable means for generating display commands and read commands and for transmitting said commands over said connection means to said recorder unit, said means including said data processor of said recorder unit being operable under the control of said program to respond to display commands received from said reader instrument to transmit the count of said events as derived by said data processor means without interruption of said recording mode, and to shift from a recording mode to a read mode and transmit under the control of said program accumulated count data from said memory means through said connection means to said reader instrument, said reader instrument including means for displaying on said visual display the event count received from said recorder unit and means for recording in said recording device accumulated count data received from said recorder unit.

7. Apparatus for counting and recording the count of events at a surveillance site comprising, in combination:

a recorder unit adapted to be located at a surveillance site and connected to detector means providing successive detector signals responsive to successive actuations of said detector means by successive events, and a portable reader instrument separate from and adapted to be connected to said recorder unit, said recorder unit including semi-conductor memory means for storage of data and instructions of a program, means including a programmable data processor connected to and operable under the control of a program of instructions stored in said memory means to record data as to said events in said memory means, a time of day clock means connected to supply clocking signals on a real time basis to said data processor, said data processor including an arithmetic and logic unit for performing computational and decisional processes in a sequence determined by said program to count said events in response to said detector signals, and to record said count as data in separate locations in said memory means for separate real time periods based upon said clocking signals, said reader instrument having means for connection to said recorder unit, a recording device for recording data on magnetic tape, and means including a manually operable keyboard for generating read commands and for transmitting said read commands over said connection means to said recorder unit, means included in said recorder unit to transmit read commands received over said connection means to said data processor, said data processor being operable under the control of said program to respond to said read commands and shift from a recording mode to a read mode and transmit count data accumulated in separate locations in said memory means of said recorder unit through said connection means to said reader instrument, said reader instrument including means for operating said recording device to record on said magnetic tape accumulated count data received from said recorder unit.

8. Apparatus for counting and recording according to claim 7, said reader instrument further including semi-conductor memory means, means including a programmable data processor connected to and operable under the control of a reader program of instructions stored in said reader instrument memory means to operate said recording device to record said accumulated count data received from said recorder unit, and a display device operated by said reader instrument data processor to display such count data, storing programs for said recorder unit, and means responsive to said manually operable means for transmitting commands to said recorder unit to shift said means including said data processor from a recording mode to a reprogramming mode and for transmitting said programs to said recorder unit, said recorder unit including means responsive to said commands for receiving and loading said transmitted programs into said memory means.

9. Apparatus for counting and recording according to claim 7, wherein said reader instrument includes programmable data processor means, semi-conductor memory means for storage of program instructions for said reader instrument data processor means, an output terminal, and input/output circuit means interfacing said reader instrument output terminal, keyboard, recording device, data processor means and memory means, said reader instrument data processor means being operable under the control of a program of instructions stored in said reader instrument memory means to operate said recording device to read data recorded on said magnetic tape and to transmit said data to peripheral devices via said output terminal.

10. Apparatus for counting and recording comprising, in combination:

a recorder unit including a case, a receptacle on the outside of said case for a plurality of input lines for signals representing events to be counted, semiconductor memory means for storing count data and for storing a program of recorder unit instructions, means including input/output circuitry for receiving event signals on said input lines and producing input signals, control means connected to said input/output circuitry to receive said input signals and including arithmetic and logic means for deriving count data in response to said input signals in accordance with instructions of said program stored in said memory means, means connecting said control means and said memory means for transferring instructions to said control means and for transferring derived count data to said memory means, a reader receptacle on the outside of said recorder unit case, said control means including means for reading count data stored in said memory means in accordance with said program of instructions in response to read commands and for transferring count data so read to said reader receptacle, a portable reader instrument separate from and adapted to be connected to said recorder unit, said reader instrument including a case, a receptacle on the outside of said reader instrument case for a cable to connect said reader instrument to said reader receptacle on said recorder unit case, a keyboard having a plurality of command keys, display means for displaying count data, a recording device for re-recording on record medium count data read from said memory means of said recorder unit, semi-conductor memory means for storing a program of reader instrument instructions, control means for generating display, record and read commands in response to selective activation of said keyboard keys in accordance with reader instrument instructions stored in said reader instrument memory means, and for transmitting read commands over said connect cable to said recorder unit control means, said reader instrument control means including means actuated in response to said record commands for operating said recording device for re-recording on said record medium count data received from said memory means of said recorder unit in response to said read commands, and means connecting said reader instrument control means to display count data on said display means in response to said display commands.

11. Apparatus for counting and recording the count of events at a surveillance site comprising, in combination:

a recorder unit adapted to be located at a surveillance site and connected to detector means providing successive detector signals responsive to successive actuations of said detector means by successive events, and a portable reader instrument separate from and adapted to be connected to said recorder unit, said recorder unit including semi-conductor memory means having separate locations for storage of data, circuit means operable in a recording mode including accumulator means for storing counts of said events in response to signals from said detector means, timer means connected to supply said circuit means with timing signals on a real time basis, said circuit means including means for transfering said counts from said accumulator means to separate locations in said memory means for separate real time periods based upon said timing signals, said reader instrument having means for connection to said recorder unit, a recording device, and manually operable means for generating read commands and for transmitting said read commands over said connection means to said recorder unit, said recorder unit circuit means being operable in a read mode in response to said read commands to transmit counts accumulated in separate locations in said memory means of said recorder unit through said connection means to said reader instrument, said reader instrument including means for operating said recording device to re-record accumulated counts received from said recorder unit.

12. Apparatus for counting and recording the count of events at a surveillance site comprising, in combination:

a recorder unit adapted to be located at a surveillance site and connected to detector means providing successive detector signals responsive to successive actuations of said detector means by successive events, said recorder unit including semi-conductor memory means having separate locations for storage of data, circuit means operable in a recording mode including accumulator means incremented in response to signals from said detector means to provide a count of said events, timer means connected to supply said circuit means with timing signals on a real time basis, said circuit means including means for transfering accumulated count from said accumulator means to separate locations in said memory means for separate real time periods based upon said timing signals, a terminal, and input/output circuit means between said terminal and said circuit means, said recorder unit circuit means being operable in a read mode in response to read commands received via said terminal and said input/output circuit means to transmit count data from separate locations in said memory means of said recorder unit through said terminal to peripheral equipment.

13. Apparatus according to claim 12 for counting, classifying and recording traffic data, said detector means including a pair of detectors in each lane of a multiple lane roadway spaced a given distance apart, and said detectors in each lane providing separate signals including:

(1) a first signal representing the time duration for a vehicle to pass one of said detectors, and (2) a second signal representing the time duration for the same vehicle to pass the other detector in a lane, said recorder unit circuit means including means operable:

(1) in response to said second signal, and with said given spacing distance, to increment said accumulator means and thereby count each passing vehicle, to derive the velocity of each said passing vehicle, and to classify said passing vehicles according to velocity and transfer to said memory means in velocity categories, the count of all vehicles passing in each lane; and (2) in response to said first signal, and having derived the vehicle velocity, to classify said passing vehicles according to length and transfer to said memory means in length categories, the count of all vehicles passing in each lane.

14. Apparatus for counting and recording the count of events at a surveillance site comprising, in combination:

a recorder unit adapted to be set at a surveillance site and connected to detector means providing detector signals responsive to events, said recorder unit including semi-conductor memory means having separate locations for data storage, counter means, circuit means operable in a recording mode to increment said counter means in response to said detector signals from said detector means for recording said events as count data, and for transfering said count data from said counter means on a time interval basis to separate locations in said memory means, a terminal providing means for interconnection between said recorder unit and peripheral equipment, and input/output circuit means for transmitting count data upon command between said memory means and said terminal.

15. Apparatus for counting and recording the count of events at a surveillance site comprising:

a recorder unit adapted to be located at a surveillance site and connected to detector means providing successive detector signals responsive to successive actuations of said detector means by successive events, said recorder unit including semi-conductor memory means having separate locations for storage of data and instructions of a program, means including a programmable data processor connected to and operable under the control of a program of instructions stored in said memory means to function in a recording mode, a time of day clock means connected to supply timing signals on a real time basis to said data processor, said data processor including an arithmetic and logic unit for performing computational and decisional processes in a sequence determined by said program to count said events in response to said detector signals, and to accumulate said count as data in separate locations in said memory means for separate real time periods based upon said timing signals, said recorder unit including a terminal and input/output circuitry between said data processor and said terminal, said data processor of said recorder unit being operable under the control of a program to respond to read commands received via said terminal and input/output circuitry and shift from a recording mode to a read mode and transmit count data accumulated in separate locations in said memory means of said recorder unit to said terminal means for transmission to peripheral equipment.

16. A reader instrument for reading data from a recorder unit, having means for connection to said recorder unit, said reader instrument including a programmable data processor, semi-conductor memory means for storing a program of instructions for said reader instrument data processor, a display device, a recording device, and input/output circuit means interfacing said reader instrument connection means, recording device, data processor, memory means, and display device; said reader instrument data processor being operable under the control of a program of instructions stored in said reader instrument memory means to generate and transmit read commands to said recorder unit and to operate said display device to display and said recording device to record data received from said recorder unit in response to said read commands.

17. Apparatus for counting and recording events at a surveillance site comprising:

a recorder unit adapted to be located at a surveillance site and connected to detector means providing signals representing events occurring at said site, said recorder unit including memory means for storage of data, circuit means operable to record data in said memory means and to read data from said memory means, said circuit means including means for accumulating counts of said events in response to signals from said detector means, timer means connected to said circuit means, means for operating said circuit means to transfer counts from said accumulator means on a time interval basis and record said counts as data in said memory means.

said recorder unit having terminal means connected to said circuit means and for connection to an external device, said recorder unit including means for operating said circuit means to read data from said memory means in response to read instructions received from said external device via said terminal means, and to transmit such data to said external device via said terminal means.

18. Apparatus according to claim 17 wherein said circuit means of said recorder unit includes data processor means, said memory means provides storage for data and for program instructions, and said means for operating said circuit means includes a program of instructions stored in said memory means.

19. Apparatus according to claim 18, wherein the data processor means is operable under control of a program of instructions stored in said memory means and in response to instructions received from an external device via said terminal means.

20. Counting and recording apparatus according to claim 17, and in combination therewith, a reader device having means for connection to said terminal means of said recorder unit, said reader device having a recorder component, and circuit means for operating said reader device-recorder component to record data received from said recorder unit via said connection means.

21. A reader instrument for reading data from a recorder unit having a memory for storage of data, said reader instrument including means adapted for connection to a recorder unit, data processor means operable under program control, memory means for storing a program of instructions for said reader instrument data processor means, a recording device, an input/output circuit means interfacing said reader instrument connection means, recording device, data processor and memory means; said reader instrument data processor means being operable under the control of a program of instructions stored in said reader instrument memory means to generate and transmit read commands to said recorder unit to read data from the memory of the recorder unit with description codes in a header portion preceding the data and to operate said recording device to record the data received from said recorder unit in response to said read commands.

22. Apparatus for counting and recording the count of events at a surveillance site comprising, in combination:

a recorder unit adapted to be located at a surveillance site and connected to detector means providing detector signals responsive to actuations of said detector means by events, and a reader instrument separate from and adapted to be connected to said recorder unit, said recorder unit including semi-conductor memory means having locations for storage of data, data processor means operable under control of a program in a recording mode for storing data as to said events in said memory means and in a read mode to read said data from said memory means;

said reader instrument having means for connection to said recorder unit, a recording device, data processor means operable under control of a program in a read mode to transmit read commands over said connection means to said data processor means of said recorder unit, said recorder unit data processor means being operable in response to said read commands to transmit data in locations in said memory means of said recorder unit through said connection means to said reader instrument, said reader instrument data processor means being operable under control of a program for operating said recording device to re-record data received from said recorder unit.

23. Apparatus according to claim 22 wherein said recorder unit semi-conductor memory means provides locations for program instructions, said reader instrument memory means provides locations for program instructions, and said recorder unit data processor means is operable under control of program instructions stored in both said recorder unit memory means and said reader instrument memory means, to record and read data, 24. Apparatus according to claim 22 wherein said recorder unit data processor means is operable under control of program instructions stored in said reader instrument memory means to read data from the memory means of the recorder unit with description codes in a header portion preceding the data.

25. Apparatus for counting and recording the count of events at a surveillance site comprising:

a recorder unit adapted to be located at a surveillance site and connected to detector means providing detector signals responsive to actuations of said detector means by events, said recorder unit including semi-conductor memory means having locations for stroage of data and instructions of a program, data processor means operable under the control of a program of instructions stored in said memory means to function in a recording mode to record event data in response to said detector signals, a terminal, input/output circuit means connecting said terminal and said data processor means, said data processor means of said recorder unit being operable in response to instructions received from a peripheral device via said terminal and under control of a program of instructions stored in said memory means, to read event data from said memory means and to transmit such data via said terminal to said peripheral device.

26. Apparatus according to claim 25 wherein the event data read from the memory means of said recording device is transmitted with description codes in a header portion preceding the data.

* * * * *